(12) United States Patent
Hsieh et al.

(10) Patent No.: US 11,095,893 B2
(45) Date of Patent: Aug. 17, 2021

(54) PRIMARY TRANSFORM AND SECONDARY TRANSFORM IN VIDEO CODING

(71) Applicant: QUALCOMM Incorporated, San Diego, CA (US)

(72) Inventors: Cheng-Teh Hsieh, Del Mar, CA (US); Vadim Seregin, San Diego, CA (US); Xin Zhao, San Diego, CA (US); Amir Said, San Diego, CA (US); Vijayaraghavan Thirumalai, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 244 days.

(21) Appl. No.: 15/782,686

(22) Filed: Oct. 12, 2017

(65) Prior Publication Data

US 2018/0103252 A1 Apr. 12, 2018

Related U.S. Application Data

(60) Provisional application No. 62/407,421, filed on Oct. 12, 2016.

(51) Int. Cl.
*H04N 19/122* (2014.01)
*H04N 19/176* (2014.01)
(Continued)

(52) U.S. Cl.
CPC ......... *H04N 19/122* (2014.11); *H04N 19/176* (2014.11); *H04N 19/18* (2014.11); *H04N 19/1883* (2014.11); *H04N 19/124* (2014.11)

(58) Field of Classification Search
CPC ...... H04N 19/00; H04N 19/12; H04N 19/112; H04N 19/122; H04N 19/18; H04N 19/176
See application file for complete search history.

(56) References Cited

U.S. PATENT DOCUMENTS 10,015,493 B2 * 7/2018 Lin ..................... H04N 19/12
2012/0008675 A1 1/2012 Karczewicz et al.
(Continued)

FOREIGN PATENT DOCUMENTS

CN 102811111 A 12/2012
EP 2464013 A1 6/2012

OTHER PUBLICATIONS

Alshina E., et al., "CE7: Experimental results of ROT by Samsung," Joint Collaborative Team on Video Coding (JCT-VC) of ITU-T SG16 WP3 and ISO/IEC JTC1/SC29/WG11, 5th Meeting, Document No. JCTVC-E380, Mar. 17, 2011, 10 pp.
(Continued)

*Primary Examiner* — Brian T Pendleton
*Assistant Examiner* — Kyle M Lotfi
(74) *Attorney, Agent, or Firm* — Shumaker & Sieffert, P.A.

(57) ABSTRACT

A video coding device (e.g., a video encoder or a video decoder) is configured to perform various transformations on video data. The video coding device applies a primary transform to a block of the video data, the primary transform having a first size, and the sub-block being at least a portion of the block. The video coding device determines whether application of a secondary transform, having a second size, to a sub-block of the block is allowed. Application of the secondary transform is disallowed when the first size is equal to the second size. Based on the application of the secondary transform being allowed, the video coding device applies the secondary transform to the sub-block. Application of the primary transform and the secondary transform construct a residual block in a pixel domain.

18 Claims, 11 Drawing Sheets

(51) Int. Cl.
  *H04N 19/18* (2014.01)
  *H04N 19/169* (2014.01)
  *H04N 19/124* (2014.01)

(56) References Cited

U.S. PATENT DOCUMENTS

| | | | | |
|---|---|---|---|---|
| 2012/0128065 | A1* | 5/2012 | Shibahara | H04N 19/122 |
| | | | | 375/240.03 |
| 2014/0254661 | A1* | 9/2014 | Saxena | H04N 19/625 |
| | | | | 375/240.2 |
| 2016/0014414 | A1* | 1/2016 | Lin | H04N 19/12 |
| | | | | 375/240.02 |
| 2016/0088310 | A1* | 3/2016 | Lin | H04N 19/60 |
| | | | | 375/240.12 |
| 2016/0219283 | A1 | 7/2016 | Chen et al. | |
| 2016/0219290 | A1 | 7/2016 | Zhao et al. | |
| 2017/0238013 | A1 | 2/2017 | Said et al. | |
| 2017/0094313 | A1 | 3/2017 | Zhao et al. | |
| 2017/0094314 | A1 | 3/2017 | Zhao et al. | |
| 2017/0238014 | A1 | 8/2017 | Said et al. | |
| 2017/0238019 | A1 | 8/2017 | Said et al. | |
| 2017/0295380 | A1* | 10/2017 | Huang | H04N 19/12 |
| 2018/0020216 | A1* | 1/2018 | Philippe | H04N 19/122 |
| 2018/0077417 | A1* | 3/2018 | Huang | H04N 19/70 |
| 2019/0149822 | A1* | 5/2019 | Kim | H04N 19/159 |
| | | | | 375/240.02 |
| 2020/0213626 | A1* | 7/2020 | Ikai | H04N 19/176 |

OTHER PUBLICATIONS

Alshina E., et al., "Description of Exploration Experiments on Coding Tools", Joint Video Exploration Team (JVET) of 26 TU-T SG16 WP3 and ISO/IEC JTC1/SC29/WG11 2nd Meeting: San Diego, USA, Feb. 20-26, 2016, JVET-81011, Feb. 26, 2016, 5 pp.

Alshina E., et al., "Description of Exploration Experiments on Coding Tools", Joint Video Exploration Team (JVET) of 30 TU-T SG16 WP3 and ISO/IEC JTC1/SC29/WG11 3rd Meeting: Geneva, CH, May 26-31, 2016, JVET-C1011, May 1, 2016, 9 pp.

Alshina E., et al., "Known tools performance investigation for next generation video coding", 52nd Meeting, Jun. 19-26, 2015, Warsaw, Poland; ITU-Telecommunications Standarization Sector Study Group 16 Question 6 Video Coding Experts Group (VCEG), VCEG-AZ05, Jun. 18, 2015, 5 pp.

An, et al., "Boundary-Dependent Transform for Inter-Predicted Residue," JCTVC-G281, PowerPoint presentation, 7th JCTVC Meeting, Geneva, CH, Nov. 21-30, 2011, 12 slides.

Britanak et al., "Discrete Cosine and Sine Transforms: General Properties, Fast Algorithms and Integer Approximations", Acadmemic Press, pp. 16-38 (2007).

Chen, et al., "Preliminary version of High efficiency video coding (HEVC) scalable extension Draft 6," Joint Collaborative Team on Video Coding (JCT-VC) of ITU-T SG 16 WP 3 and ISO/IEC JTC 1, Document: JCTVC-Q1008v2, Mar. 27-Apr. 4, 2014, 160 pp.

Chen H., et al., "New Transforms Tightly Bounded by DCT and KLT," IEEE Signal Processing Letters, vol. 19, No. 6, Jun. 1, 2012, pp. 344-347, XP011442399.

Chen J., et al., "Algorithm Description of Joint Exploration Test Model 1," 1, JVET Meeting; Oct. 19, 2015-Oct. 21, 2015; Geneva;(The Joint Video Exploration Team of ISO/IEC JTC1/SC29/WG11 and ITU-T SG.16 ); URL: http://phenix.int-evry.fr/jvet/,, No. JVET-A1001 Feb. 24, 2016 (Feb. 24, 2016), XP030150000, 27 pages.

Cintra R.J., et al., "Energy-Efficient 8-Point DCT Approximations: Theory and Hardware Architectures," Circuits, Systems and Signal Processing, vol. 35, No. 11, Dec. 30, 2015, pp. 4009-4029, XP036042554.

Doganata, Z., et al., "General Synthesis Procedures for FIR Lossless Transfer Matrices, for Perfect-Reconstruction Multirate Filter Bank Applications", IEEE Transactions on Acoustics, Speech, and Signal Processing, vol. 36, No. 10, Oct. 1988, pp. 1561-1574.

Egilmez, H., et al., "Graph-Based Transforms for Inter Predicted Video Coding" in Proc IEEE int. Conf. Image Process., Quebec City, Canada, Sep. 2015, pp. 3992-3996.

Han J., et al., "Towards jointly optimal spatial prediction and adaptive transform in video/image coding," IEEE International Conference on Acoustics, Speech and Signal Processing (ICASSP), pp. 726-729 (Mar. 2010).

Huang H., "EE2.1: Quadtree plus binary tree structure integration with JEM tools," Joint Video Exploration Team (JVET) of ITU-T SG 16 WP 3 and ISO/IEC JTC 1/SC 29/WG 11, 3rd Meeting: Geneva, CH, May 26-Jun. 1, 2016, JVET-00024, 5 pp.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

ITU-T H.261, Line Transmission of Non-Telephone Signals, Video Codec for Audiovisual Services At p × 64 kbits, The International Telecommunication Union, Mar. 1990, 32 pp.

ITU-T H.262 (Feb. 2000), "Information Technology—Generic Coding of Moving Pictures and Associated Audio Information: Video", Series H: Audiovisual and Multimedia Systems, Infrastructure of Audiovisual Services—Coding of Moving Video, Feb. 2000, 220 pages.

ITU-T H.263 "Series H: Audiovisual and Multimedia Systems Infrastructure of audiovisual service-Coding of moving video: Video coding for low bitrate communication," (Jan. 2005), 226 pages.

Zou F., et al., "Rate-Distortion Optimized Transforms Based on the Lloyd-Type Algorithm for Intra Block Coding," IEEE Journal of Selected Topics in Signal Processing, Dec. 2013, vol. 7, Issue 6, pp. 1072-1083.

ITU-T H.264, Series H: Audiovisual and Multimedia Systems, Infrastructure of audiovisual services—Coding of moving video, Advanced video coding for generic audiovisual services, Mar. 2005, 343 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, High efficiency video coding, The International Telecommunication Union, Apr. 2013, 317 pages.

ITU-T H.265, Series H: Audiovisual and Multimedia Systems, Infrastructure of audiovisual services—Coding of moving video, High efficiency video coding, The International Telecommunication Union, Apr. 2015, 634 pp.

ITU-T H.265, Series H: Audiovisual and Multimedia Systems, Infrastructure of audiovisual services—Coding of moving video, High efficiency video coding, The International Telecommunication Union, Oct. 2014, 540 pp.

ITU-T Rec. H.261 (1211990), "Line Transmission on Non-Telephone Signals, Video Codec for Audiovisual Services AT P × 64 k bit/s", Dec. 1990, 32 pp.

ITU-T Rec. H.262 (Jul. 1995), "Transmission on Non-Telephone Signals, Information Technology—Generic Coding of Moving Pictures and Associated Audio Information: Video", Jul. 1995, 211 pp.

Jain A.K., "A sinusoidal family of unitary transforms", IEEE Transactions on Pattern Analysis and Machine Intelligence, Oct. 1, 1979, pp. 356-365, IEEE Service Center, XP011242370, ISSN: 0162-8828.

Karczewicz M., et al., "Study of Coding Efficiency Improvements beyond HEVC," 113. MPEG Meeting; Oct. 19, 2015-Oct. 23, 2015; Geneva; (Motion Picture Expert Group or ISO/IEC JTC1/SC29/WG11),, No. M37102, Oct. 15, 2015 (Oct. 15, 2015), XP030065470, whole document.

Lim S-C., et al., "Rate-Distortion Optimized Adaptive Transform Coding," Optical Engineering, Aug. 2009, vol. 48, No. 8, pp. 087004-1-087004-14, 14 Pages.

Mandyam G., et al., "Lossless Image Compression Using the Discrete Cosine Transform," Journal of Visual Communication and Image Representation, vol. 8, No. 1, Mar. 1, 1997, pp. 21-26, XP055356472. [ retrieved on Mar. 6, 1995 ].

(56) References Cited

OTHER PUBLICATIONS

Marpe D., et al., "Transform Coding Using the Residual Quadtree (RQT)", Fraunhofer Heinrich Hertz Institute, 4pp. URL: http://www.hhi.fraunhofer.de/fields-of-competence/image-processing/researchgroups/ image-video-coding/hevc-high-efficiency-video-coding/transform-coding-using-the-residual-quadtree-rqt.html ; [ Retrieved on Feb. 9, 2017].

Martucci S.A., et al., "Symmetric convolution and the discrete sine and cosine transforms," IEEE Transactions on Signal Processing, vol. 42, No. 5, May 1, 1994, pp. 1038-1051, IEEE Signal Processing Society, XP000863873.

Mccann K., et al., "Samsung's Response to the Call for Proposals on Video Compression Technology," Joint Collaborative Team on Video Coding (JCT-VC) of ITU-T SG-16 WP3 and ISO/IEC JTC1/SC29/WG11, 1st meeting, Document: JCTVC-A124, Dresden, DE, Apr. 15-23, 2010, 42 pp.

Parfieniuk M., "Using the CS Decomposition to Compute the 8-Point DCT," IEEE International Symposium on Circuits and Systems (ISCAS), May 1, 2015, pp. 2836-2839, XP055360685.

Qualcomm: "Mode-Dependent Non-Separable Secondary Transform", ITU-T SG16 Meeting, Oct. 12, 2015-Oct. 23, 2015, Geneva, No. T13-SG16-C-1 044, Sep. 30, 2015 (Sep. 30, 2015), XP030100752.

Said A., "Highly Efficient Non-Separable Transforms for Next Generation Video Coding", 2016 Picture Coding Symposium (PCS): Nuremberg, Germany, Dec. 4-7, 2016; IEEE, pp. 1-5.

Saxena A., et al., "DCT/DST-Based Transform Coding for Intra Prediction in Image/Video Coding," IEEE Transactions on Image Processing, Oct. 2013, vol. 22, Issue 10, pp. 3974-3981.

Sezer O.G., et al., "Approximation and Compression with Sparse Orthonormal Transforms", IEEE Transactions on Image Processing, vol. 24, No. 8, Aug. 2015, pp. 2328-2343.

Suehring, K., et al., "JVET common test conditions and software reference configurations", Joint Video Exploration Team (JVET) of ITU-T SG16 WP3 and ISO/IEC JTC1/SC29/WG11 2nd Meeting: San Diego, USA Feb. 20-26, 2017, JVET-B1010, Apr. 4, 2016, 4 pp.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012 (Dec. 1, 2012), pp. 1649-1668, XP011487803, ISSN: 1051-8215, DOI:10.1109/TCSVT.2012.2221191.

Takamura S., et al., "On Intra Coding Using Mode Dependent 2D-KL T", in Proc 30th Picture Coding Symp, San Jose CA, Dec. 2013, pp. 137-140.

Tech G, et al., "MV-HEVC Draft Text 8", 8. JCT-3V Meeting, Mar. 29, 2014-Apr. 4, 2014, Valencia, (The Joint Collaborative Team on 3d Video Coding Extension Development of ISO/IEC JTC1/SC29/WG11 and ITU-T SG.16 ), URL: http://phenix.int-evry.fr/jct3v/, JCT3V-H1002-v5, Jun. 3, 2014, XP030132292, 163 pages.

Vaidyanathan P. P., et al., "14.6.1 Factorization of Real Unitary Matrices Using Givens Rotations," Chapter 14, Multirate Systems and Filter Banks, Prentice Hall Signal Processing Series, 1993, pp. 747-750.

Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.

Wien M., "High Efficiency Video Coding", Coding Tools and Specification, Springer-Verlag, Berlin, 2015, 30 pp.

Ye Y., et al., "Improved H.264 Intra Coding Based on Bi-Directional Intra Prediction, Directional Transform, and Adaptive Coefficient Scanning", 15th IEEE International Conference on Image Processing, 2008. ICIP 2008, Oct. 2008, pp. 2116-2119.

Yeo C., et al., "Mode-Dependent Transforms for Coding Directional Intra Prediction Residuals," IEEE Transactions on Circuits and Systems for Video Technology, Apr. 2012, vol. 22, No. 4, pp. 545-554.

Zhao X., EE1: Improvements on non-separable secondary transform, Joint Video Exploration Team (JVET) of ITU-T SG16 WP3 and ISO/IEC JTC1/SC29/WG11 4th Meeting: Chengdu, CN, JVET-D0120, Oct. 15-21, 2016, 5 pp.

Zhao X., et al., "EE2.7 related: Improved non-separable Secondary Transform," 3, JVET Meeting; May 26, 2016-Jun. 1, 2016; Geneva; (The Joint Video Exploration Team of ISO/IEC JTC1/SC29/WG11 and ITU-T SG.16 ); URL: http://phenix.int-evry.frovet/,, No. JVET-00063 XP030150165, 3 pages.

Zhao X., et al., "EE2.7: TU-level non-separable secondary transform", Joint Video Exploration Team (JVET) of ITU-T SG16 WP3 and ISO/IEC JTC1/SC29/WG11 3rd Meeting: Geneva, CH, May 26-Jun. 1, 2016, JVET-00053_v3, 10 pp.

Zhao X., et al., "EE2.7: TU-level non-separable Secondary Transform," 3, JVET Meeting; May 26, 2016-Jun. 1, 2016; Geneva; (The Joint Video Exploration Team of ISO/IEC JTC1/SC29/WG11 and ITU-T SG.16 ); URL: http://phenix.int-evry.fr/jvet/,, No. JVET-00053 XP030150151, 10 pages.

Zhao X., et al., "Video Coding with Rate-Distortion Optimizer Transform," IEEE Transactions on Circuits and Systems for Video Technology, vol. 22, No. 1, Jan. 2012, pp. 138-151.

Zhao X., et al., "TU-level non-separable secondary transform", Joint Video Exploration Team (JVET) of ITU-T SG16 WP3 and ISO/IEC JTC1/SC29/WG11 2nd Meeting: San Diego, USA, Feb. 20-26, 2016, JVET-B0059, 5 pp.

Zhao X., et al., "TU-level non-separable Secondary Transform," 2, JVET Meeting; Feb. 20, 2016-Feb. 26, 2016; San Diego; (The Joint Video Exploration Team of ISO/IEC JTC1/SC29/WG11 and ITU-T SG.16 ); URL: http://phenix.int-evry.fr/jvet/,, No. JVET-B0059 Feb. 17, 2016 (Feb. 17, 2016), XP030150066, 5 pages.

Zhu S., at al., "In Search of "Better-than-DCT" Unitary Transforms for Encoding of Residual Signals," IEEE Signal Processing Letters, vol. 17, No. 11, Nov. 1, 2010, pp. 961-964, XP011319095.

\* cited by examiner

| luma intra mode | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|
| transform set index | 0 | 0 | 1 | 2 | 1 | 2 | 1 | 2 | 3 | 4 | 3 | 4 | 3 | 4 | 5 | 5 | 5 | 6 | 6 | 6 | 7 | 7 | 7 | 8 | 9 | 8 | 9 | 8 | 9 | 10 | 11 | 10 | 11 | 10 |
| luma intra mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 1 |
| transform set index | 11 | 10 | 11 | 10 | 11 | 10 | 9 | 8 | 9 | 8 | 9 | 8 | 7 | 7 | 7 | 6 | 6 | 6 | 5 | 5 | 5 | 4 | 3 | 4 | 3 | 4 | 3 | 2 | 1 | 2 | 1 | 2 | 1 | - |

FIG. 5A

PRIMARY TRANSFORM AND SECONDARY TRANSFORM IN VIDEO CODING

This application claims the benefit of U.S. Provisional Application No. 62/407,421, filed Oct. 12, 2016, the entire content of which is incorporated herein by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in various standards including defined by ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264/MPEG-4, Part 10, Advanced Video Coding (AVC), and ITU-T H.265, High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, the disclosure describes a video coding device (e.g., a video encoder or a video decoder) configured to perform various transformations on video data. The video coding device applies a primary transform to a block of the video data, the primary transform having a first size. The video coding device determines whether application of a secondary transform to a sub-block of the block is allowed. The sub-block comprises at least a portion of the block. The secondary transform has a second size. Application of the secondary transform to the sub-block is disallowed when the first size is equal to the second size. Based on the application of the secondary transform to the sub-block being allowed, the video coding device applies the secondary transform to the sub-block. Application of the primary transform to the block and the secondary transform to the sub-block construct a residual block in a pixel domain. The video coding device reconstructs the block based on the residual block and one or more corresponding predictive blocks.

In one example, the disclosure is directed to a method for coding video data that includes applying a primary transform to a block of the video data, the primary transform having a first size; determining whether application of a secondary transform to a sub-block of the block is allowed, wherein the sub-block comprises at least a portion of the block, wherein the secondary transform has a second size, and application of the secondary transform to the sub-block is disallowed when the first size is equal to the second size; based on the application of the secondary transform to the sub-block being allowed, applying the secondary transform to the sub-block, wherein application of the primary transform to the block and the secondary transform to the sub-block construct a residual block in a pixel domain; and reconstructing the block based on the residual block and one or more corresponding predictive blocks.

In another example, the disclosure is directed to a device for processing video data, the device including a memory for storing video data and one or more processors configured to: apply a primary transform to a block of the video data, the primary transform having a first size; determine whether application of a secondary transform to a sub-block of the block is allowed, wherein the sub-block comprises at least a portion of the block, wherein the secondary transform has a second size, and application of the secondary transform to the sub-block is disallowed when the first size is equal to the second size; based on the application of the secondary transform to the sub-block being allowed, apply the secondary transform to the sub-block, wherein application of the primary transform to the block and the secondary transform to the sub-block construct a residual block in a pixel domain; and reconstruct the block based on the residual block and one or more corresponding predictive blocks.

In another example, the disclosure is directed to a non-transitory computer-readable medium containing instructions that, when executed, cause one or more processors to apply a primary transform to a block of the video data, the primary transform having a first size; determine whether application of a secondary transform to a sub-block of the block is allowed, wherein the sub-block comprises at least a portion of the block, wherein the secondary transform has a second size, and application of the secondary transform to the sub-block is disallowed when the first size is equal to the second size; based on the application of the secondary transform to the sub-block being allowed, apply the secondary transform to the sub-block, wherein application of the primary transform to the block and the secondary transform to the sub-block construct a residual block in a pixel domain; and reconstruct the block based on the residual block and one or more corresponding predictive blocks.

In another example, the disclosure is directed to an apparatus for coding video data, the apparatus including means for applying a primary transform to a block of the video data, the primary transform having a first size; means for determining whether application of a secondary transform to a sub-block of the block is allowed, wherein the sub-block comprises at least a portion of the block, wherein the secondary transform has a second size, and application of the secondary transform to the sub-block is disallowed when the first size is equal to the second size; based on the application of the secondary transform to the sub-block being allowed, means for applying the secondary transform to the sub-block, wherein application of the primary transform to the block and the secondary transform to the sub-block construct a residual block in a pixel domain; and means for reconstructing the block based on the residual block and one or more corresponding predictive blocks.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 5A is an illustration of an example mapping from luma intra mode to transform set index.

DETAILED DESCRIPTION

Figure 1:
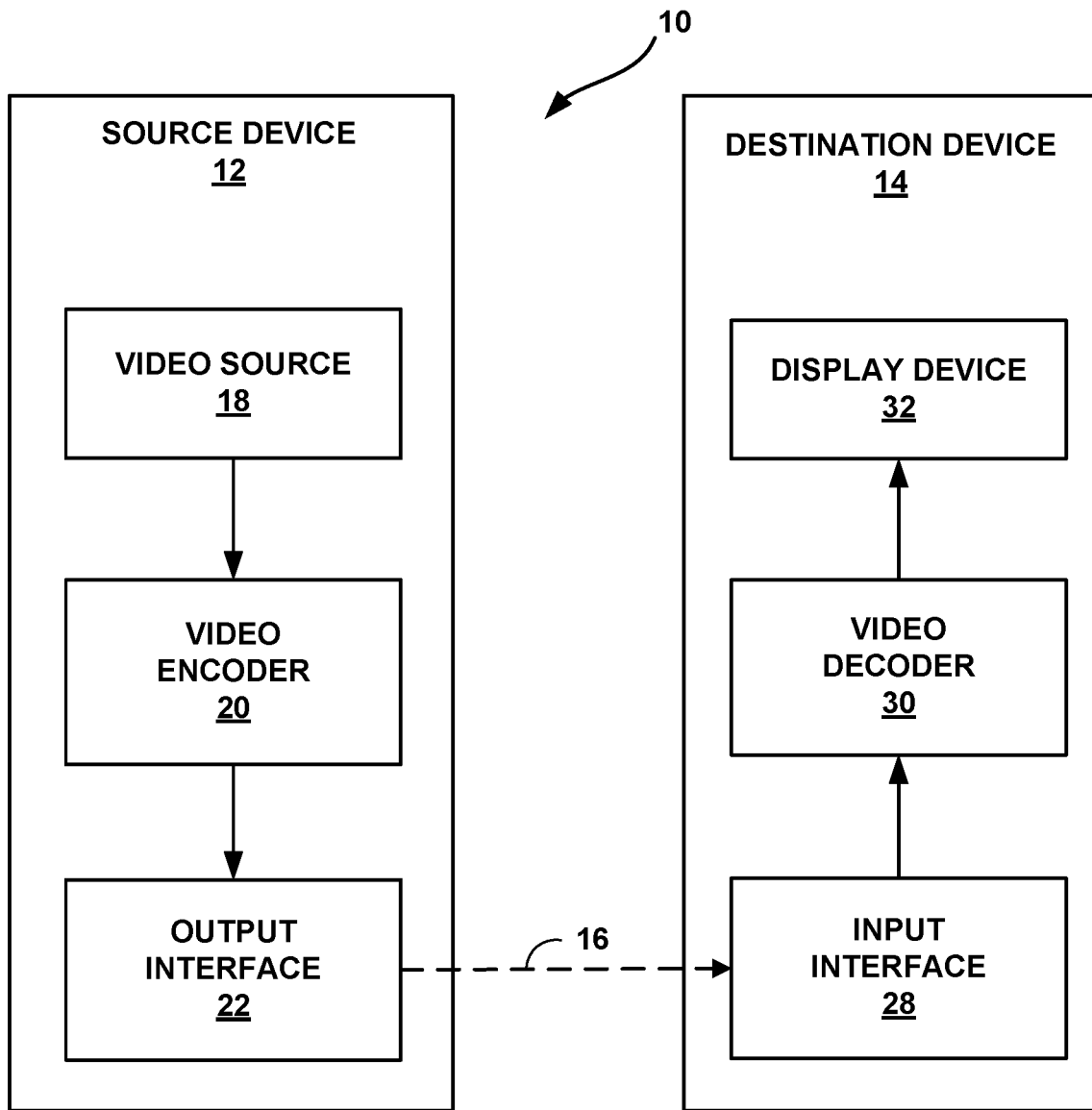
FIG. 1 is a block diagram illustrating an example video encoding and decoding system that may utilize techniques described in this disclosure.

In general, this disclosure describes techniques related to secondary transform designs applied for intra or inter prediction residual data in video coding. The secondary transform may be used in the context of advanced video codecs, such as extensions of High Efficiency Video Coding (HEVC) or the next generation of video coding standards. Specifically, a video coding device determines a size of a block that a primary transform will be applied to, and then determines a size of a sub-block that a secondary transform will be applied to. If the size of the block is equal to the size of the sub-block, the video coding device may refrain from performing the secondary transform, either entirely or at least during the process of the primary transform. If the size of the sub-block is smaller than the size of the block, then the video coding device may perform the secondary transform on the sub-block at least partially in parallel with the primary transform.

Video coding devices may utilize residual blocks in a form suitable for output from a video encoder to a video decoder. To reduce an amount of data transmitted from the video encoder to the video decoder, the video encoding device may reduce an amount of data used to represent the residual blocks. In video coding, separable transforms have been applied over non-separable transforms because separable transforms may use fewer operations (e.g., addition, multiplication), as compared to a non-separable transform. Separable transforms are filters that can be written as a product of two or more filters. In contrast, a non-separable filter cannot be written as a product of two or more filters. Primary transforms may include both separable and non-separable transforms, but are, generally, transforms that change the domain of the video data (e.g., from a pixel domain to a frequency domain, or from a frequency domain to a pixel domain).

Rather than relying solely on a primary transform that converts a residual block in a pixel domain to a coefficient block in a frequency domain, a video encoder may also apply a secondary transform (i.e., transforms on video data that do not change the domain of the video data), to increase energy compaction of the coefficient block. For instance, the secondary transform may concentrate non-zero coefficients of the coefficient block closer to the DC coefficient of the coefficient block. As a result, there may be fewer coefficients between the DC coefficient of the coefficient block and the last significant (i.e., non-zero) coefficient of the coefficient block, resulting in a reduced amount of data used to represent the residual block. Similarly, a video decoder may apply an inverse secondary transform and an inverse primary transform to transform the coefficient block into a residual block. In this manner, data used to represent residual blocks may be reduced, thereby reducing bandwidth requirements and/or storage requirements for the video data, and potentially reducing energy usage of the video decoder and video encoder.

Existing designs of the secondary transform do not allow for parallel processing of the secondary transform and the primary transform. In other words, a video encoder may not apply the secondary transform until the primary transform is complete. Likewise, a video decoder may not apply the inverse primary transform until the inverse secondary transform is complete. This delay is greatest if the secondary transform size (i.e., the size of the sub-block on which the video coding device applies the secondary transform) is equal to the primary transform size (i.e., the size of the block on which the video coding device applies the primary transform).

As such, techniques of this disclosure may enable a video coding device to bypass the secondary transform when the secondary transform size (or the size of the sub-block on which the secondary transform will be performed) is equal to the primary transform size (or the size of the block on which the primary transform will be performed). In other words, the video coding device may only perform the secondary transform when the secondary transform size is less than the primary transform size. In such instances, when the primary transform process is complete with regards to the sub-block of equal size to the sub-block on which the secondary transform is to be performed, the video coding device may begin to perform the secondary transform process while completing the primary transform process. This may decrease the overall processing time for coding the video data, leading to a more time- and power-efficient coding process.

FIG. 1 is a block diagram illustrating an example video encoding and decoding system 10 that may utilize techniques described in this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In an example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques described in this disclosure, such as, for example, techniques relating to secondary transforms. In accordance with this disclosure, video decoder 30 of destination device 14 may be configured to apply the techniques described in this disclosure, such as, for example, techniques relating to secondary transforms. In other examples, a source device and a destination device may include other components or arrangements. For example, source device 12 may receive video data from an external video source 18, such as an external camera. Likewise, destination device 14 may interface with an external display device, rather than including an integrated display device.

As noted above, source device 12 includes output interface 22 and destination device 14 includes input interface 28. In some examples, output interface 22 represents a transmitter and input interface 28 represents a receiver. In other examples, output interface 22 and input interface 28 represent examples of transceivers (that is, interfaces capable of both transmitting and receiving data signals wirelessly). The transceivers may be configured to send and receive video data in wireless signals. For example, output interface 22, when implemented as a transceiver, may send a data signal (e.g., computer-readable medium 16) including encoded video data, while input interface 28, when implemented as a transceiver, may receive a data signal (e.g., computer-readable medium 16) including encoded video data. As discussed above, video encoder 20 may provide the encoded video data to output interface 22, while input interface 28 may provide encoded video data to video decoder 30.

The illustrated system 10 of FIG. 1 is merely one example. Techniques described in this disclosure may be performed by any digital video encoding and/or decoding device. Although generally the techniques of this disclosure are performed by a video encoding device and a video decoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto computer-readable medium 16.

Computer-readable medium 16 may include transient media, such as a wireless broadcast or wired network transmission. In some examples, a network server (not shown) may receive encoded video data from source device 12 and provide the encoded video data to destination device 14, e.g., via network transmission. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Video encoder 20 and video decoder 30 may operate according to a video coding standard, such as the standards described above and, in some examples, according to the High Efficiency Video Coding (HEVC) standard, also referred to as ITU-T H.265, or extensions of the HEVC standard, or according to the next generation of video coding standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to a protocol such as the ITU H.223 multiplexer protocol, or other protocols such as the user datagram protocol (UDP).

The techniques of this disclosure are generally described with respect to ITU-T H.265, also referred to as High Efficiency Video Coding (HEVC), which is described in "SERIES H: AUDIOVISUAL AND MULTIMEDIA SYSTEMS, Infrastructure of audiovisual services—Coding of moving video," *High Efficiency Video Coding*, ITU-T H.265, April 2013. However, these techniques may be applied to other video coding standards, including extensions of HEVC and extensions of other standards. Examples of other video coding standards include ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264/MPEG-4, Part 10, Advanced Video Coding (AVC), including its Scalable Video Coding (SVC) and Multiview Video Coding (MVC) extensions.

The H.265 standard was recently finalized by the Joint Collaboration Team on Video Coding (JCT-VC) of ITU-T Video Coding Experts Group (VCEG) and ISO/IEC Motion Picture Experts Group (MPEG). The multiview extension to HEVC, MV-HEVC, has also been developed by the JCT-3V. A scalable extension to HEVC, named SHVC, has also been developed by the JCT-VC.

In HEVC and other video codecs, a video frame or picture may be divided into a sequence of treeblocks, which are also known as largest coding units (LCUs), that may include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices.

To generate an encoded CTU (i.e., to encode a CTU) in HEVC, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. In monochrome pictures or pictures having three separate color planes, a CU may comprise a single coding block and syntax structures used to code the samples of the coding block.

Each treeblock may be split into CUs according to a quadtree data structure. In general, a quadtree data structure includes one node per CU, with a root node corresponding to the treeblock. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU are also referred to as leaf-CUs even if there is no explicit splitting of the original leaf-CU. For example, if a CU at 16×16 size is not split further, the four 8×8 sub-CUs are also referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). A size of the CU corresponds to a size of the coding node and is generally square in shape. The size of the CU may range from 8×8 pixels up to the size of the treeblock with a maximum size, e.g., 64×64 pixels or greater.

A CU includes a coding node and prediction units (PUs) and transform units (TUs) associated with the coding node. Each CU may contain one or more PUs and one or more TUs. Syntax data associated with a CU may describe, for example, partitioning of the CU into one or more PUs. As part of encoding a CU, video encoder 20 may partition a coding block of the CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU. In monochrome pictures or pictures having three separate color planes, a PU may comprise a single prediction block and syntax structures used to predict the prediction block. In some video coding standards, a CU is not partitioned into multiple PUs.

Video encoder 20 may use intra prediction or inter prediction to generate the predictive blocks for a PU. Each CU is coded with one of either intra prediction mode or inter prediction mode. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU. Partitioning modes may differ between whether the CU is skip or direct mode encoded, intra-prediction mode encoded, or inter-prediction mode encoded. PUs may be partitioned to be non-square in shape.

Furthermore, video encoder 20 may decompose each residual block of a CU into one or more transform blocks. A transform block may be a rectangular (square or non-square) block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the luma residual block of the CU. The Cb transform block may be a sub-block of the Cb residual block of the CU. The Cr transform block may be a sub-block of the Cr residual block of the CU. In monochrome pictures or pictures having three separate color planes, a TU may comprise a single transform block and syntax structures used to transform the samples of the transform block. In some examples, the residual blocks of the same CU for luma and chroma components may be partitioned in different ways.

Syntax data associated with a CU may also describe, for example, partitioning of the CU into one or more TUs (e.g., according to a quadtree). A TU can be square or non-square (e.g., rectangular) in shape. This disclosure may use the term "block" to refer to any of a CU, PU, or TU, in the context of HEVC, or similar data structures in the context of other standards (e.g., macroblocks and sub-blocks thereof in H.264/AVC).

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized. The RQT may also be referred to as a transform tree. For example, a split flag may indicate whether a leaf-CU is split into four transform units. Then, each transform unit may be split further into further sub-TUs. When a TU is not split further, it may be referred to as a leaf-TU. In some examples, the maximum size of a leaf-TU may correspond to the size of the corresponding leaf-CU. In general, this disclosure uses the terms CU and TU to refer to leaf-CU and leaf-TU, respectively, unless noted otherwise.

A video sequence typically includes a series of video frames or pictures. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block has 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a technique or mode of generating predictive pixel data in the spatial domain (also referred to as the pixel domain) and the TUs may comprise coefficients in the transform domain following application of a transform, e.g., a Discrete Cosine Transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs to include quantized transform coefficients representative of the residual data for the CU. That is, video encoder 20 may calculate the residual data (in the form of a residual block), transform the residual block to produce a block of transform coefficients, and then quantize the transform coefficients to form quantized transform coefficients. Video encoder 20 may form a TU including the quantized transform coefficients, as well as other syntax information (e.g., splitting information for the TU).

In order to adapt to various characteristics of residual blocks, the video coding device may, in the examples where the CU is a square-shaped CU (i.e., the height of the CU is equal to the width of the CU), apply a transform coding structure using a RQT in HEVC. As briefly described above, the video coding device may divide each picture into coding tree units (CTUs). The CTUs may be coded in raster scanning order for a specific tile or slice. A CTU may be a square block and may represent the root of a quadtree, e.g., a coding tree. The CTU size may range from 8×8 to 64×64 luma samples, but 64×64 is typically used. Each CTU may be further split into smaller square blocks called CUs. After a CTU is split recursively into CUs, each CU may be further divided into one or more PUs and one or more TUs. The partitioning of a CU into TUs may be carried out recursively based on a quadtree approach. Therefore, the residual signal of each CU is coded by a tree structure namely, a residual quadtree (RQT).

Figure 2:
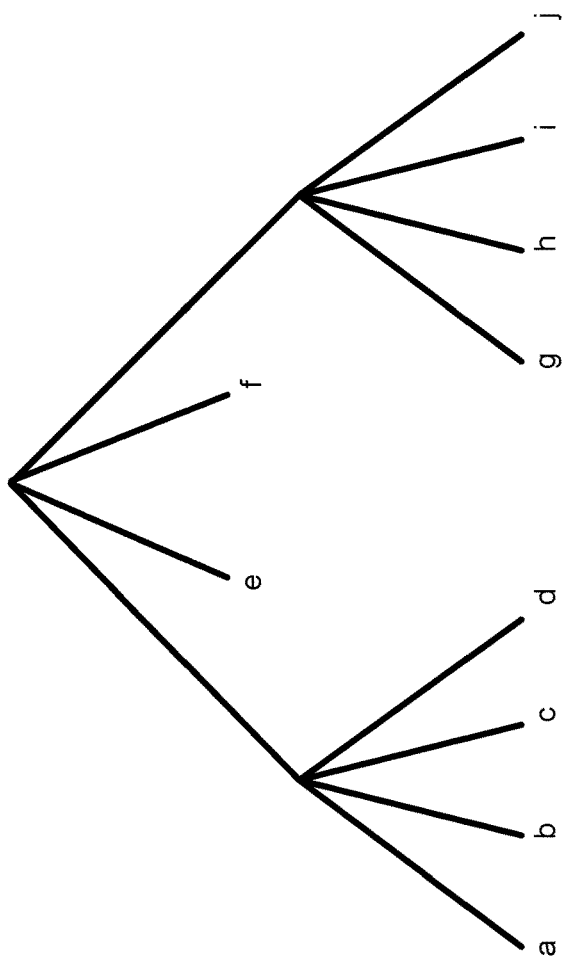
FIG. 2 is an illustration of a transform scheme based on residual quadtree in HEVC that may utilize techniques described in this disclosure.
Figure 2:
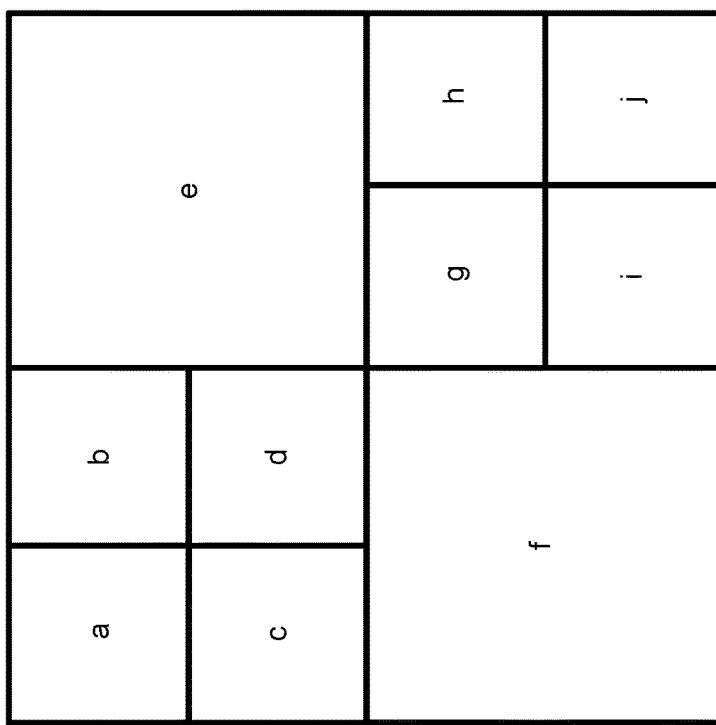

A RQT allows TU sizes from 4×4 up to 32×32 luma samples. FIG. 2 shows an example where a CU includes ten TUs, labeled with the letters a to j, and the corresponding block partitioning. Each node of the RQT may actually be a TU. The video coding device may process individual TUs in depth-first tree traversal order, which is illustrated in FIG. 2 as alphabetical order, which follows a recursive Z-scan with depth-first traversal. The quadtree approach may enable the adaptation of the transform to the varying space-frequency characteristics of the residual signal. Typically, larger transform block sizes, which have larger spatial support, provide better frequency resolution. However, smaller transform block sizes, which have smaller spatial support, provide better spatial resolution. The video coding device may choose the trade-off between the two, spatial and frequency resolutions. For example, the video coding device may choose the choice of larger or smaller transform block sizes based on a rate-distortion optimization technique. The rate-distortion optimization technique may calculate a weighted sum of coding bits and reconstruction distortion, e.g., the rate-distortion cost, for each coding mode (e.g., a specific RQT splitting structure). Additionally, the rate-distortion optimization technique may select the coding mode with least rate-distortion cost as the best mode.

As noted above, following application of any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scanning order to scan the quantized transform coefficients to produce a serialized vector that can be entropy encoded. In other examples, video encoder 20 may perform an adaptive scan.

After scanning the quantized transform coefficients to form a one-dimensional vector, video encoder 20 may entropy encode particular syntax elements representing transform coefficients in the one-dimensional vector, e.g., according to context-adaptive variable length coding (CAVLC), context-adaptive binary arithmetic coding (CABAC), syntax-based context-adaptive binary arithmetic coding (SBAC), probability interval partitioning entropy (PIPE) coding or another entropy encoding methodology. Video encoder 20 may also entropy encode syntax elements associated with the encoded video data for use by video decoder 30 in decoding the video data.

In general, video decoder 30 performs a similar, albeit reciprocal, process to that performed by video encoder 20 to decode encoded data. For example, video decoder 30 inverse quantizes and inverse transforms transform coefficients of a received TU to reproduce a residual block. Video decoder 30 may use a signaled prediction mode (intra- or inter-prediction) to form a predicted block. Video decoder 30 may combine the predicted block and the residual block (on a pixel-by-pixel basis) to reproduce the original block. Video decoder 30 may perform additional processing, such as performing a deblocking process, to reduce visual artifacts along block boundaries. Furthermore, video decoder 30 may decode syntax elements using CABAC in a manner substantially similar to, albeit reciprocal to, the CABAC encoding process of video encoder 20.

In accordance with the techniques of this disclosure, a video coding device, such as video encoder 20 or video decoder 30, may code video data. For the purposes of this disclosure, coding may mean either encoding or decoding. Unless it is specifically referred to as encoding or decoding, any use of the word "code" or "coding" should be interpreted to encompass both encoding and decoding. Both of video encoder 20 and video decoder 30 may perform the techniques described herein.

As previously noted, a video coding device (e.g., video encoder 20 or video decoder 30) may apply a primary transform. Such primary transforms include a DCT, an integer transform, a wavelet transform, or a conceptually similar transform to residual video data, among other things. Such separable transforms may indicate the process of deriving an alternative representation of the input signal. Given an N-point vector $x=[x_0, x_1, \ldots, x_{N-1}]^T$ and a set of given vectors $\{\Phi_0, \Phi_1, \ldots, \Phi_{M-1}\}$, x can be approximated or exactly represented using a linear combination of $\Phi_0$, $\Phi_1, \ldots, \Phi_{M-1}$, which can be formulated as follows, $$\hat{x} = \Sigma_{i=0}^{M-1} f_i \cdot \Phi_i$$

where $\hat{x}$ can be an approximation or equivalent of x, vector $f=[f_1, f_2, \ldots, f_{M-1}]$ are the transform coefficient vectors and $\{\Phi_0, \Phi_1, \ldots, \Phi_{M-1}\}$ are the transform basis vectors.

In the scenario of video coding, transform coefficients may be roughly non-correlated and sparse. For example, the energy of the input vector x may be compacted for only a few transform coefficients, and the remaining majority transform coefficients are typically close to zero.

Given the specific input data, the optimal transform, in terms of energy compaction, may be the so-called Karhunen-Loeve transform (KLT). The KLT uses the eigenvectors of the covariance matrix of the input data as transform basis vectors. Therefore, the KLT is actually a data-dependent transform and does not have a general mathematical formulation. However, under certain assumptions, such as the input data forming a first-order stationary Markov process, the corresponding KLT is actually a member of the sinusoidal family of unitary transforms. The sinusoidal family of unitary transforms may indicate transforms using transform basis vectors formulated as follows:

$$\Phi_m(k) = A \cdot e^{ik\theta} + B \cdot e^{-ik\theta}$$

In the equation above, e is the base of the natural logarithm approximately equal to 2.71828. Each of A, B, and θ are complex in general, and depend on the value of m. Additionally, in the equation above, $\Phi_m$ is a vector, $\Phi_m(k)$ indicates the kth component of vector $\Phi_m$, and i indicates the imaginary part of a complex number.

Several well-known transforms, including the discrete Fourier transform, cosine transform, sine transform, and the KLT (for first-order stationary Markov processes), are members of this sinusoidal family of unitary transforms. The complete DCT and Discrete Sine Transform (DST) families may include a total of 16 transforms based on different types and a complete definition of the different types of DCT and DST are given below. The different types may correspond to different values of A, B, and θ.

Assume an input N-point vector is denoted as $x=[x_0, x_1, \ldots, x_{N-1}]^T$, and the N-point vector is transformed to another N-point transform coefficient vector denoted as $y=[y_0, y_1, \ldots, y_{N-1}]^T$ by multiplying a matrix. The process transforming x to y can be further illustrated according to one of the following transform formulations, wherein k ranges from 0 through N−1, inclusive:

DCT Type-I (DCT-1)

$$y_k = \sum_{n=0}^{N-1} \sqrt{\frac{2}{N-1}} \cos\left(\frac{\pi \cdot n \cdot k}{N-1}\right) \cdot w_0 \cdot w_1 \cdot x_n,$$

where $$w_0 = \begin{cases} \frac{1}{\sqrt{2}}, & \text{if } n = 0 \text{ or } n = N-1 \\ 1, & \text{otherwise} \end{cases}, \quad w_1 = \begin{cases} \frac{1}{\sqrt{2}}, & \text{if } k = 0 \text{ or } k = N-1 \\ 1, & \text{otherwise} \end{cases}$$

DCT Type-II (DCT-2)

$$y_k = \sum_{n=0}^{N-1} \sqrt{\frac{2}{N}} \cos\left(\frac{\pi \cdot (n+0.5) \cdot k}{N-1}\right) \cdot w_0 \cdot x_n,$$

where $$w_0 = \begin{cases} \frac{1}{\sqrt{2}}, & \text{if } k = 0 \\ 1, & \text{otherwise} \end{cases}$$

DCT Type-III (DCT-3)

$$y_k = \sum_{n=0}^{N-1} \sqrt{\frac{2}{N}} \cos\left(\frac{\pi \cdot n \cdot (k+0.5)}{N}\right) \cdot w_0 \cdot x_n,$$

where $w_0 = \begin{cases} \frac{1}{\sqrt{2}}, & \text{if } n = 0 \\ 1, & \text{otherwise} \end{cases}$ DCT Type-IV (DCT-4)

$$y_k = \sum_{n=0}^{N-1} \sqrt{\frac{2}{N}} \cos\left(\frac{\pi \cdot (n+0.5) \cdot (k+0.5)}{N}\right) \cdot x_n,$$

DCT Type-V (DCT-5)

$$y_k = \sum_{n=0}^{N-1} \sqrt{\frac{2}{N-0.5}} \cos\left(\frac{\pi \cdot n \cdot k}{N-0.5}\right) \cdot w_0 \cdot w_1 \cdot x_n,$$

where $w_0 = \begin{cases} \frac{1}{\sqrt{2}}, & \text{if } n = 0 \\ 1, & \text{otherwise} \end{cases}$, $$w_1 = \begin{cases} \frac{1}{\sqrt{2}}, & \text{if } k = 0 \\ 1, & \text{otherwise} \end{cases}$$

DCT Type-VI (DCT-6)

$$y_k = \sum_{n=0}^{N-1} \sqrt{\frac{2}{N-0.5}} \cos\left(\frac{\pi \cdot (n+0.5) \cdot k}{N-0.5}\right) \cdot w_0 \cdot w_1 \cdot x_n,$$

where $w_0 = \begin{cases} \frac{1}{\sqrt{2}}, & \text{if } n = N-1 \\ 1, & \text{otherwise} \end{cases}$, $$w_1 = \begin{cases} \frac{1}{\sqrt{2}}, & \text{if } k = 0 \\ 1, & \text{otherwise} \end{cases}$$

DCT Type-VII (DCT-7)

$$y_k = \sum_{n=0}^{N-1} \sqrt{\frac{2}{N-0.5}} \cos\left(\frac{\pi \cdot n \cdot (k+0.5)}{N-0.5}\right) \cdot w_0 \cdot w_1 \cdot x_n,$$

where $w_0 = \begin{cases} \frac{1}{\sqrt{2}}, & \text{if } n = 0 \\ 1, & \text{otherwise} \end{cases}$, $w_1 = \begin{cases} \frac{1}{\sqrt{2}}, & \text{if } k = N-1 \\ 1, & \text{otherwise} \end{cases}$

DCT Type-VIII (DCT-8)

$$y_k = \sum_{n=0}^{N-1} \sqrt{\frac{2}{N+0.5}} \cos\left(\frac{\pi \cdot (n+0.5) \cdot (k+0.5)}{N+0.5}\right) \cdot x_n,$$

DST Type-I (DST-1)

$$y_k = \sum_{n=0}^{N-1} \sqrt{\frac{2}{N+1}} \sin\left(\frac{\pi \cdot (n+1) \cdot (k+1)}{N+1}\right) \cdot x_n,$$

DST Type-II (DST-2)

$$y_k = \sum_{n=0}^{N-1} \sqrt{\frac{2}{N}} \sin\left(\frac{\pi \cdot (n+0.5) \cdot (k+1)}{N}\right) \cdot w_0 \cdot x_n,$$

where $w_0 = \begin{cases} \frac{1}{\sqrt{2}}, & \text{if } k = N-1 \\ 1, & \text{otherwise} \end{cases}$

DST Type-III (DST-3)

$$y_k = \sum_{n=0}^{N-1} \sqrt{\frac{2}{N}} \sin\left(\frac{\pi \cdot (n+1) \cdot (k+0.5)}{N}\right) \cdot w_0 \cdot x_n,$$

where $w_0 = \begin{cases} \frac{1}{\sqrt{2}}, & \text{if } n = N-1 \\ 1, & \text{otherwise} \end{cases}$

DST Type-IV (DST-4)

$$y_k = \sum_{n=0}^{N-1} \sqrt{\frac{2}{N}} \sin\left(\frac{\pi \cdot (n+0.5) \cdot (k+0.5)}{N}\right) \cdot x_n,$$

DST Type-V (DST-5)

$$y_k = \sum_{n=0}^{N-1} \sqrt{\frac{2}{N+0.5}} \sin\left(\frac{\pi \cdot (n+1) \cdot (k+1)}{N+0.5}\right) \cdot x_n,$$

DST Type-VI (DST-6)

$$y_k = \sum_{n=0}^{N-1} \sqrt{\frac{2}{N+0.5}} \sin\left(\frac{\pi \cdot (n+0.5) \cdot (k+1)}{N+0.5}\right) \cdot x_n,$$

DST Type-VII (DST-7)

$$y_k = \sum_{n=0}^{N-1} \sqrt{\frac{2}{N+0.5}} \sin\left(\frac{\pi \cdot (n+1) \cdot (k+0.5)}{N+0.5}\right) \cdot x_n,$$

DST Type-VIII (DST-8)

$$y_k = \sum_{n=0}^{N-1} \sqrt{\frac{2}{N-0.5}} \cos\left(\frac{\pi \cdot (n+0.5) \cdot (k+0.5)}{N-0.5}\right) \cdot w_0 \cdot w_1 \cdot x_n,$$

where $w_0 = \begin{cases} \frac{1}{\sqrt{2}}, & \text{if } n = N-1 \\ 1, & \text{otherwise} \end{cases}$, $w_1 = \begin{cases} \frac{1}{\sqrt{2}}, & \text{if } k = N-1 \\ 1, & \text{otherwise} \end{cases}$ A transform type, such as a DST type, may be specified by a mathematical formulation of a transform basis function. For example, 4-point DST-VII and 8-point DST-VII have the same transform type, regardless the value of N.

Without loss of generality, all the above transform types may be represented using the generalized formulation below:

$$y_m = \sum_{n=0}^{N-1} T_{m,n} \cdot x_n.$$

In the equation above, T is the transform matrix that may be specified by the definition of one certain transform, e.g., DCT Type-I~DCT Type-VIII, or DST Type-I~DST Type- VIII, and the row vectors of T, e.g., [$T_{i,0}$, $T_{i,1}$, $T_{i,2}$, ..., $T_{i,N-1}$] are the $i^{th}$ transform basis vectors. A transform applied on the N-point input vector may be called an N-point transform.

It is also noted that the above transform formulations, which are applied on the 1-D input data x, can be represented in matrix multiplication form as below:

$$y = T \cdot x$$

In the equation above, T indicates the transform matrix, x indicates the input data vector, and y indicates the output transform coefficients vector.

The video coding device may apply the transforms introduced in the previous section on 1-D input data, and transforms can be also extended for 2-D input data sources. X may be an input M×N data array. The techniques of applying transform on 2-D input data may include separable and non-separable 2-D transforms.

A separable 2-D transform applies 1-D transforms for horizontal and vertical vectors of X sequentially, formulated as below:

$$Y = C \cdot X \cdot R^T$$

In the equation above, C and R denote the given M×M and N×N transform matrices, respectively. From the formulation, it can be seen that C applies 1-D transforms for the column vectors of X, while R applies 1-D transforms for row vectors of X. For simplicity, C and R are denoted as left (vertical) and right (horizontal) transforms and they both form a transform pair. There are cases when C is equal to R and is an orthogonal matrix. In such a case, the video coding device may determine the separable 2-D transform by just one transform matrix.

In some examples, a non-separable 2-D transform may first reorganize all elements of X into a single vector, namely X', by applying the following mathematical mapping:

$$X'_{(i \cdot N+j)} = X_{i,j}$$

Then, the video coding device may apply a 1-D transform T' for X' as below:

$$Y = T' \cdot X'$$

In the equation above, T' is an (M*N)×(M*N) transform matrix.

In video coding, a video coding device may apply separable 2-D transforms, as 2-D transforms may use fewer operation counts (e.g., addition, multiplication) as compared to a 1-D transform.

In conventional video codecs, such as H.264/AVC, an integer approximation of the 4-point and 8-point DCT Type-II is applied for both intra and inter prediction residual. In other words, a video coder may apply an integer approximation of the 4-point and 8-point DCT Type-II to residual blocks generated using intra or inter prediction. To better accommodate various statistics of residual samples, more flexible types of transforms other than DCT Type-II are utilized in the new generation video codec. For example, in HEVC, the video coding device may utilize an integer approximation of the 4-point Type-VII DST for intra prediction residual. It has been both theoretically proven and experimentally validated that the DST Type-VII used in HEVC is more efficient than DCT Type-II for residuals vectors generated along intra prediction directions. For instance, DST Type-VII is more efficient than DCT Type-II for row residual vectors generated by the horizontal intra prediction direction. In HEVC, an integer approximation of 4-point DST Type-VII is applied only for 4×4 luma intra prediction residual blocks. The 4-point DST-VII used in HEVC is shown below:

4×4 DST-VII:
{29, 55, 74, 84}
{74, 74, 0, −74}
{84, −29, −74, 55}
{55, −84, 74, −29}

In HEVC, for residual blocks that are not 4×4 luma intra prediction residual blocks, integer approximations of the 4-point, 8-point, 16-point and 32-point DCT Type-II may also be applied, as shown below:

4-point DCT-II:
{64, 64, 64, 64}
{83, 36, −36, −83}
{64, −64, −64, 64}
{36, −83, 83, −36}

8-point DCT-II:
{64, 64, 64, 64, 64, 64, 64, 64}
{89, 75, 50, 18, −18, −50, −75, −89}
{83, 36, −36, −83, −83, −36, 36, 83}
{75, −18, −89, −50, 50, 89, 18, −75}
{64, −64, −64, 64, 64, −64, −64, 64}
{50, −89, 18, 75, −75, −18, 89, −50}
{36, −83, 83, −36, −36, 83, −83, 36}
{18, −50, 75, −89, 89, −75, 50, −18}

16-point DCT-II:
{64, 64, 64, 64, 64, 64, 64, 64, 64, 64, 64, 64, 64, 64, 64, 64}
{90, 87, 80, 70, 57, 43, 25, 9, −9, −25, −43, −57, −70, −80, −87, −90}
{89, 75, 50, 18, −18, −50, −75, −89, −89, −75, −50, −18, 18, 50, 75, 89}
{87, 57, 9, −43, −80, −90, −70, −25, 25, 70, 90, 80, 43, −9, −57, −87}
{83, 36, −36, −83, −83, −36, 36, 83, 83, 36, −36, −83, −83, −36, 36, 83}
{80, 9, −70, −87, −25, 57, 90, 43, −43, −90, −57, 25, 87, 70, −9, −80}
{75, −18, −89, −50, 50, 89, 18, −75, −75, 18, 89, 50, −50, −89, −18, 75}
{70, −43, −87, 9, 90, 25, −80, −57, 57, 80, −25, −90, −9, 87, 43, −70}
{64, −64, −64, 64, 64, −64, −64, 64, 64, −64, −64, 64, 64, −64, −64, 64}
{57, −80, −25, 90, −9, −87, 43, 70, −70, −43, 87, 9, −90, 25, 80, −57}
{50, −89, 18, 75, −75, −18, 89, −50, −50, 89, −18, −75, 75, 18, −89, 50}
{43, −90, 57, 25, −87, 70, 9, −80, 80, −9, −70, 87, −25, −57, 90, −43}
{36, −83, 83, −36, −36, 83, −83, 36, 36, −83, 83, −36, −36, 83, −83, 36}
{25, −70, 90, −80, 43, 9, −57, 87, −87, 57, −9, −43, 80, −90, 70, −25}
{18, −50, 75, −89, 89, −75, 50, −18, −18, 50, −75, 89, −89, 75, −50, 18}
{9, −25, 43, −57, 70, −80, 87, −90, 90, −87, 80, −70, 57, −43, 25, −9}

32-point DCT-II:
{64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64}
{90, 90, 88, 85, 82, 78, 73, 67, 61, 54, 46, 38, 31, 22, 13, 4, −4, −13, −22, −31, −38, −46, −54, −61, −67, −73, −78, −82, −85, −88, −90, −90}

{90, 87, 80, 70, 57, 43, 25, 9, −9, −25, −43, −57, −70, −80, −87, −90, −90, −87, −80, −70, −57, −43, −25, −9, 9, 25, 43, 57, 70, 80, 87, 90}
{90, 82, 67, 46, 22, −4, −31, −54, −73, −85, −90, −88, −78, −61, −38, −13, 13, 38, 61, 78, 88, 90, 85, 73, 54, 31, 4, −22, −46, −67, −82, −90}
{89, 75, 50, 18, −18, −50, −75, −89, −89, −75, −50, −18, 18, 50, 75, 89, 89, 75, 50, 18, −18, −50, −75, −89, −89, −75, −50, −18, 18, 50, 75, 89}
{88, 67, 31, −13, −54, −82, −90, −78, −46, −4, 38, 73, 90, 85, 61, 22, −22, −61, −85, −90, −73, −38, 4, 46, 78, 90, 82, 54, 13, −31, −67, −88}
{87, 57, 9, −43, −80, −90, −70, −25, 25, 70, 90, 80, 43, −9, −57, −87, −87, −57, −9, 43, 80, 90, 70, 25, −25, −70, −90, −80, −43, 9, 57, 87}
{85, 46, −13, −67, −90, −73, −22, 38, 82, 88, 54, −4, −61, −90, −78, −31, 31, 78, 90, 61, 4, −54, −88, −82, −38, 22, 73, 90, 67, 13, −46, −85}
{83, 36, −36, −83, −83, −36, 36, 83, 83, 36, −36, −83, −83, −36, 36, 83, 83, 36, −36, −83, −83, −36, 36, 83, 83, 36, −36, −83, −83, −36, 36, 83}
{82, 22, −54, −90, −61, 13, 78, 85, 31, −46, −90, −67, 4, 73, 88, 38, −38, −88, −73, −4, 67, 90, 46, −31, −85, −78, −13, 61, 90, 54, −22, −82}
{80, 9, −70, −87, −25, 57, 90, 43, −43, −90, −57, 25, 87, 70, −9, −80, −80, −9, 70, 87, 25, −57, −90, −43, 43, 90, 57, −25, −87, −70, 9, 80}
{78, −4, −82, −73, 13, 85, 67, −22, −88, −61, 31, 90, 54, −38, −90, −46, 46, 90, 38, −54, −90, −31, 61, 88, 22, −67, −85, 31 13, 73, 82, 4, −78}
{75, −18, −89, −50, 50, 89, 18, −75, −75, 18, 89, 50, −50, −89, −18, 75, 75, −18, −89, −50, 50, 89, 18, −75, −75, 18, 89, 50, −50, −89, −18, 75}
{73, −31, −90, −22, 78, 67, −38, −90, −13, 82, 61, −46, −88, −4, 85, 54, −54, −85, 4, 88, 46, −61, −82, 13, 90, 38, −67, −78, 22, 90, 31, −73}
{70, −43, −87, 9, 90, 25, −80, −57, 57, 80, −25, −90, −9, 87, 43, −70, −70, 43, 87, −9, −90, −25, 80, 57, −57, −80, 25, 90, 9, −87, −43, 70}
{67, −54, −78, 38, 85, −22, −90, 4, 90, 13, −88, −31, 82, 46, −73, −61, 61, 73, −46, −82, 31, 88, −13, −90, −4, 90, 22, −85, −38, 78, 54, −67}
{64, −64, −64, 64, 64, −64, −64, 64, 64, −64, −64, 64, 64, −64, −64, 64, 64, −64, −64, 64, 64, −64, −64, 64, 64, −64, −64, 64, 64, −64, −64, 64}
{61, −73, −46, 82, 31, −88, −13, 90, −4, −90, 22, 85, −38, −78, 54, 67, −67, −54, 78, 38, −85, −22, 90, 4, −90, 13, 88, −31, −82, 46, 73, −61}
{57, −80, −25, 90, −9, −87, 43, 70, −70, −43, 87, 9, −90, 25, 80, −57, −57, 80, 25, −90, 9, 87, −43, −70, 70, 43, −87, −9, 90, −25, −80, 57}
{54, −85, −4, 88, −46, −61, 82, 13, −90, 38, 67, −78, −22, 90, −31, −73, 73, 31, −90, 22, 78, −67, −38, 90, −13, −82, 61, 46, −88, 4, 85, −54}
{50, −89, 18, 75, −75, −18, 89, −50, −50, 89, −18, −75, 75, 18, −89, 50, 50, −89, 18, 75, −75, −18, 89, −50, −50, 89, −18, −75, 75, 18, −89, 50}
{46, −90, 38, 54, −90, 31, 61, −88, 22, 67, −85, 13, 73, −82, 4, 78, −78, −4, 82, −73, −13, 85, −67, −22, 88, −61, −31, 90, −54, −38, 90, −46}
{43, −90, 57, 25, −87, 70, 9, −80, 80, −9, −70, 87, −25, −57, 90, −43, −43, 90, −57, −25, 87, −70, −9, 80, −80, 9, 70, −87, 25, 57, −90, 43}
{38, −88, 73, −4, −67, 90, −46, −31, 85, −78, 13, 61, −90, 54, 22, −82, 82, −22, −54, 90, −61, −13, 78, −85, 31, 46, −90, 67, 4, −73, 88, −38}
{36, −83, 83, −36, −36, 83, −83, 36, 36, −83, 83, −36, −36, 83, −83, 36, 36, −83, 83, −36, −36, 83, −83, 36, 36, −83, 83, −36, −36, 83, −83, 36}
{31, −78, 90, −61, 4, 54, −88, 82, −38, −22, 73, −90, 67, −13, −46, 85, −85, 46, 13, −67, 90, −73, 22, 38, −82, 88, −54, −4, 61, −90, 78, −31}
{25, −70, 90, −80, 43, 9, −57, 87, −87, 57, −9, −43, 80, −90, 70, −25, −25, 70, −90, 80, −43, −9, 57, −87, 87, −57, 9, 43, −80, 90, −70, 25}
{22, −61, 85, −90, 73, −38, −4, 46, −78, 90, −82, 54, −13, −31, 67, −88, 88, −67, 31, 13, −54, 82, −90, 78, −46, 4, 38, −73, 90, −85, 61, −22}
{18, −50, 75, −89, 89, −75, 50, −18, −18, 50, −75, 89, −89, 75, −50, 18, 18, −50, 75, −89, 89, −75, 50, −18, −18, 50, −75, 89, −89, 75, −50, 18}
{13, −38, 61, −78, 88, −90, 85, −73, 54, −31, 4, 22, −46, 67, −82, 90, −90, 82, −67, 46, −22, −4, 31, −54, 73, −85, 90, −88, 78, −61, 38, −13}
{9, −25, 43, −57, 70, −80, 87, −90, 90, −87, 80, −70, 57, −43, 25, −9, −9, 25, −43, 57, −70, 80, −87, 90, −90, 87, −80, 70, −57, 43, −25, 9}
{4, −13, 22, −31, 38, −46, 54, −61, 67, −73, 78, −82, 85, −88, 90, −90, 90, −90, 88, −85, 82, −78, 73, −67, 61, −54, 46, −38, 31, −22, 13, −4}

Figure 3A:
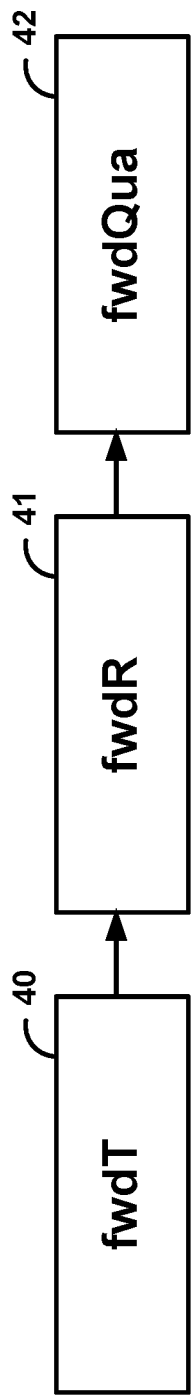
FIG. 3A is an illustration of a transform process at a video encoder.
Figure 3B:
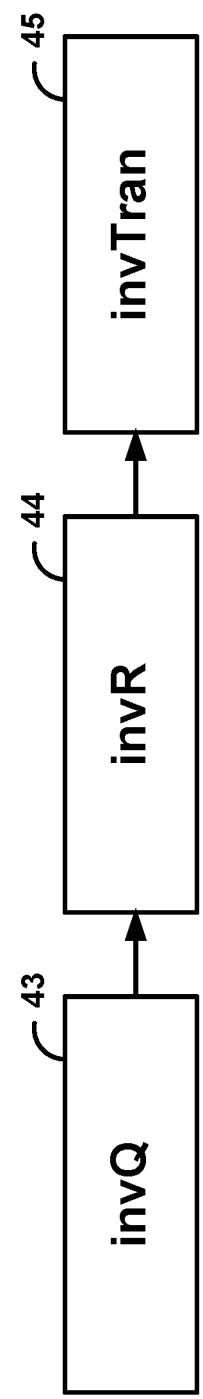
FIG. 3B is an illustration of a transform process at a video decoder.

A video coding device may use a secondary transform for better energy compaction of transform coefficients. As illustrated in FIGS. 3A and 3B, a secondary transform is another transform applied on the transform coefficients derived from the first transform process. Particularly, FIG. 3A is an illustration of an example transform process at a video encoder, such as video encoder 20. FIG. 3B is an illustration of an example transform process at a video decoder, such as video decoder 30. In the example of FIG. 3A, video encoder 20 applies a forward primary transform 40 (fwdT), followed by a secondary transform 41 (fwdR), followed by forward quantization 42 (fwdQua). In the example of FIG. 3B, video decoder 30 applies inverse quantization 43 (invQ), followed by an inverse secondary transform 44 (invR), followed by an inverse primary transform 45 (invTran). Forward primary transform 40 may convert residual samples from a pixel domain to transform coefficients in a frequency domain. Inverse primary transform 43 may convert transform coefficients in the frequency domain to residual samples in the pixel domain.

A secondary transform may be a rotational transform (ROT). The ROT does not replace the primary transform. However, the ROT is applied as a secondary transform for only the low frequency part of transform coefficients matrix. With the ROT, for each intra coded TU, an index, indicating which ROT is applied from the four pre-defined transform candidates, is signaled. A 4×4 secondary transform is applied for 4×4 intra coded TUs, while 8×8 secondary transform is applied for 8×8 and larger intra coded TUs.

Figure 4:
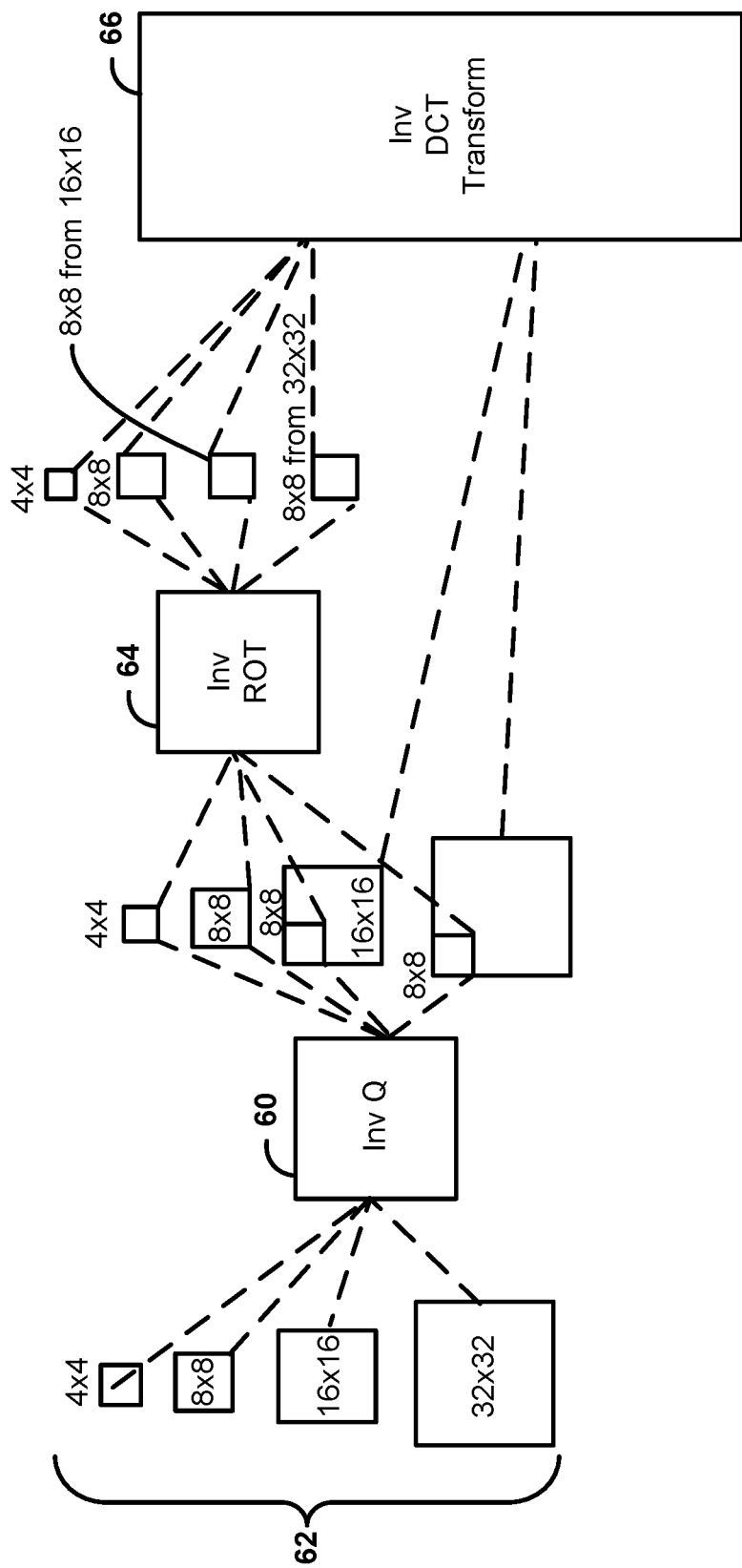
FIG. 4 is an illustration of an example rotational transform applied by a video decoder.

FIG. 4 is an illustration of an example ROT applied by a video decoder, such as video decoder 30. In the example of FIG. 4, the video decoder performs inverse quantization 60 (Inv Q) on transform coefficient blocks 62 ranging in size from 4×4 to 32×32. Furthermore, in the example of FIG. 4, the video decoder applies an inverse ROT 64 (Inv ROT) as a secondary transform for only a low frequency part of transform coefficients matrices. For instance, as shown in the example of FIG. 4, the video decoder may consider all transform coefficients of 4×4 and 8×8 transform coefficient matrices to be in low frequency parts of the transform coefficient matrices. However, as shown in FIG. 4, only transform coefficients in the top left 8×8 sub-blocks of 16×16 and 32×32 transform coefficient matrices are considered to be in low frequency parts of the transform coefficient matrices. Furthermore, in the example of FIG. 4, the video decoder applies an inverse DCT transform 66 (Inv DCT transform) to transform coefficient matrices to convert the transform coefficient matrices into residual blocks. In the example of FIG. 4, prior to applying inverse DCT transform 66 to 16×16 and 32×32 transform coefficient matrices, the video decoder may replace the top left 8×8 sub-blocks of the 16×16 and 32×32 transform coefficient matrices with the corresponding 8×8 transform coefficient matrices produced by application of inverse ROT 64.

The video coding device may extend ROT to a whole TU, not only the low-frequency part. More specifically, the video coding device may pre-define three 4×4 separable secondary transform candidates, and the video coding device may explicitly signal the selected one with a 2-bit index at the CU-level. The 2-bit index may be referred to herein as a ROT index. In one example, when the ROT index is 0, no secondary transform is applied. However, in this example, when the ROT index is 1, 2 and 3, the video coding device may apply the secondary transform corresponding to one of the three pre-defined secondary transform candidates for every TU inside a current CU. Given a selected secondary transform, for every 4×4 sub-block of the current TU, the video coding device may apply a secondary 4×4 separable secondary transform.

Figure 6:
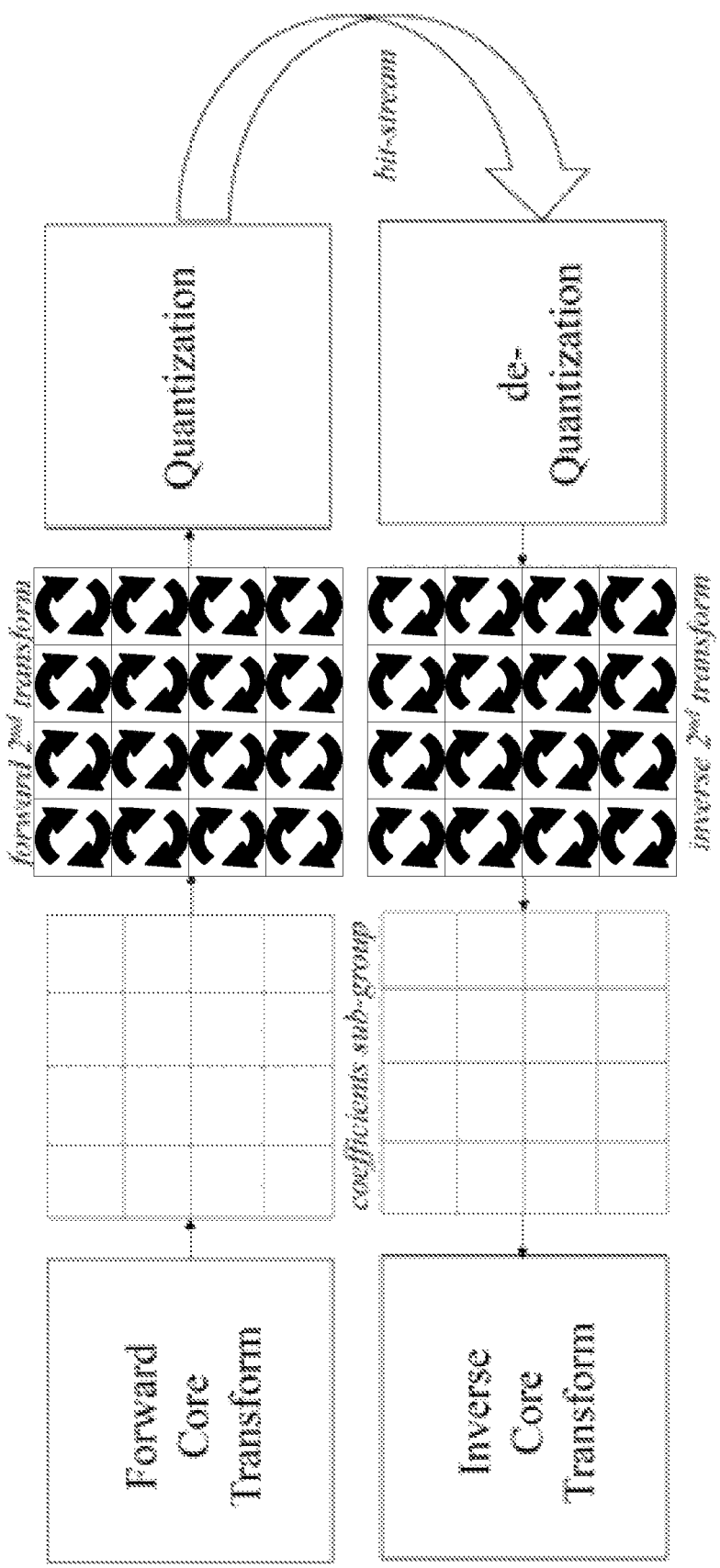
FIG. 6 is an illustration of an example secondary transform operation, in accordance with the techniques of this disclosure.

FIG. 6 is an illustration of an example secondary transform operation, in accordance with the techniques of this disclosure. As described in U.S. Patent Pub. 2017/0094313 A1 (hereinafter, the '313 application), a video encoder applies a mode-dependent non-separable secondary transform (MDNSST, or as known as NSST) between a forward primary transform and quantization. Moreover, as described in the '313 application, a video decoder applies a MDNSST between de-quantization and an inverse core transform. As shown in FIG. 6, a video coding device (e.g., video encoder 20 or video decoder 30) may perform a MDNSST independently for each 4×4 sub-group of transform coefficients within an intra-coded CU. As described in the '313 application, video coders only apply the MDNSST to intra-coded CUs.

Application of a non-separable secondary transform (e.g., the MDNSST) is described as follows using input as an example. To apply the non-separable transform, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

is represented as a vector $\vec{X}$:

$$\vec{X} = [X_{00}\, X_{01}\, X_{02}\, X_{03}\, X_{10}\, X_{11}\, X_{12}\, X_{13}\, X_{20}\, X_{21}\, X_{22}\, X_{23}\, X_{30}\, X_{31}\, X_{32}\, X_{33}]^T$$

The non-separable transform is calculated as $\vec{F} = T \cdot \vec{X}$, where $\vec{F}$ is a 16×1 transform coefficient vector, and T is a 16×16 transform matrix. The 16×1 transform coefficient vector $\vec{F}$ is subsequently re-organized as a 4×4 block using the scanning order for block X (e.g., horizontal, vertical or diagonal). The coefficients with smaller indexes are placed with the smaller index in the 4×4 coefficient block.

Figure 5B:
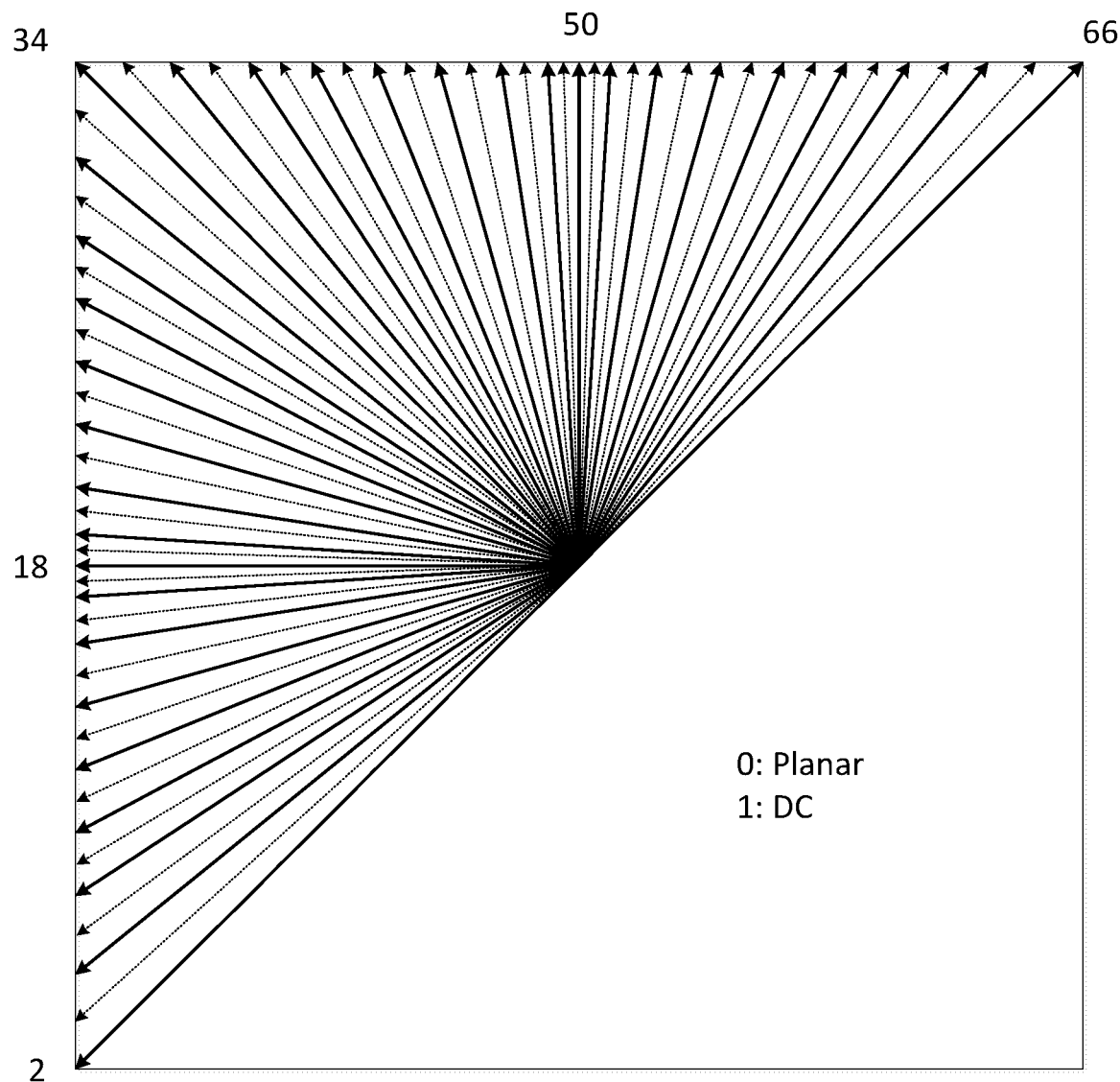
FIG. 5B is an illustration of intra prediction mode (IPM) ranges from 0 to 66.

Directional intra prediction modes are intra prediction modes where a predictive block is determined by its directional relation to the current block. Example directional intra-prediction modes are shown in FIG. 5B. Non-directional intra prediction modes are intra prediction modes where the predictive block does not have a directional relative to the current block. Example non-directional intra prediction modes include Planar, DC and LM. There may be 33 non-separable transform matrices for directional modes and 2 non-separable transform matrices for non-directional modes. The 33 non-separable transform matrices for directional modes is derived from the product of 11 and 3, where 11 is the number of transform sets for the directional intra prediction mode, and each transform set includes 3 transform matrices. For non-directional modes, only one transform set is applied, which includes 2 transform matrices. FIG. 5A defines the mapping from the intra prediction mode to the transform set index is defined. The transform set applied to luma/chroma transform coefficients is specified by the corresponding luma/chroma intra prediction modes, according to FIG. 5A.

For each transform set, the selected non-separable secondary transform candidate is further specified by the explicitly signaled CU-level MDNSST index. The MDNSST index is signaled in a bitstream once per Intra CU after transform coefficients and truncated unary binarization is used. The truncated value is 2 in case of planar or DC mode, and 3 for angular intra prediction mode. The MDNSST index is signaled for a CU only when there is more than one non-zero coefficient in the CU. The default value is zero when the MDNSST index for a CU is not signaled. When an MDNSST index for a CU is zero, no secondary transform is applied to the CU. An MDNSST index having values 1-3 indicates which secondary transform from a set of secondary transforms to apply.

In JEM, MDNSST is not applied for a block coded with transform skip mode. When an MDNSST index is signaled for a CU and not equal to zero, MDNSST shall not be used for a block of a component that is coded with transform skip mode in the CU. When a CU with blocks of all components coded in transform skip mode, MDNSST index is not signaled for the CU.

In some examples, the NSST is extended for 8×8 for better coding performance, i.e., non-separable transform applied on 8×8 block size is used as secondary transform for primary transform coefficient block with both height and width being larger than or equal to 8.

Secondary transforms may provide higher quality images after decoding. Because a secondary transform cannot be applied until the primary transform is available (i.e., a secondary transform and a primary transform cannot be processed in parallel), current designs using secondary transforms may cause additional delay in a transform module (i.e., a module that performs the primary and/or secondary transforms). This is not desired, especially for hardware pipeline processing. Further, one corner case with the highest delay could be when a size of the primary transform (i.e., the primary transform size) is equal to a size of the secondary transform (i.e., the secondary transform size).

In view of the problems discussed above, the following techniques are proposed. The following text describes itemized techniques proposed in this disclosure. Video encoder 20 and/or video decoder 30 may apply the itemized techniques individually. Alternatively, video encoder 20 and/or video decoder 30 may apply any combination of the itemized techniques.

A corner case can arise when the primary transform size is equal to the secondary transform size. In this case, the secondary transform can be applied only when the whole primary transform is finished (i.e., the entirety of the current transform unit has been transformed). To limit such cases, the video coding device may disallow the secondary transform usage having the size equal to the primary transform size. For example, the video coding device may not apply the secondary transform when the secondary transform size is equal to the primary transform size.

In other words, the video coding device may apply a primary transform to a block (e.g., a current Transform Unit (TU) of a Coding Unit (CU) or other type of block) of the video data. The primary transform may have a first size. The video coding device may determine whether application of a secondary transform to a sub-block of the block is allowed, the secondary transform having a second size, and the sub-block being at least a portion of the block. Application of the secondary transform to the sub-block is disallowed when the first size is equal to the second size. Based on the application of the secondary transform to the sub-block being allowed, the video coding device may apply the secondary transform to the sub-block. Application of the primary transform to the block and the secondary transform to the sub-block constructs a residual block in a pixel domain. The video coding device may reconstruct the block based on the residual block and one or more corresponding predictive blocks. In some examples, the block may be a top-left portion of the CU. In some instances, the primary transform size is 4×4.

In some examples, the video coding device utilizes a secondary transform size that is smaller than the primary transform size. For instance, in one example, if the primary transform is 8×8, the video coding device may use a secondary transform smaller (e.g., 4×4) than 8×8. In other words, the video coding device may apply the 4×4 secondary transform to a 4×4 sub-block of an 8×8 block. In this example, the video coding device may use the smaller secondary transform instead of using an 8×8 secondary transform even if the 8×8 secondary transform is available and the video coding device is able to use the 8×8 secondary transform for blocks larger than 8×8. In this example, the 4×4 sub-block to which the video coding device applies the secondary transform can be, for example, top-left 4×4 corner of the 8×8 block.

Figure 7:
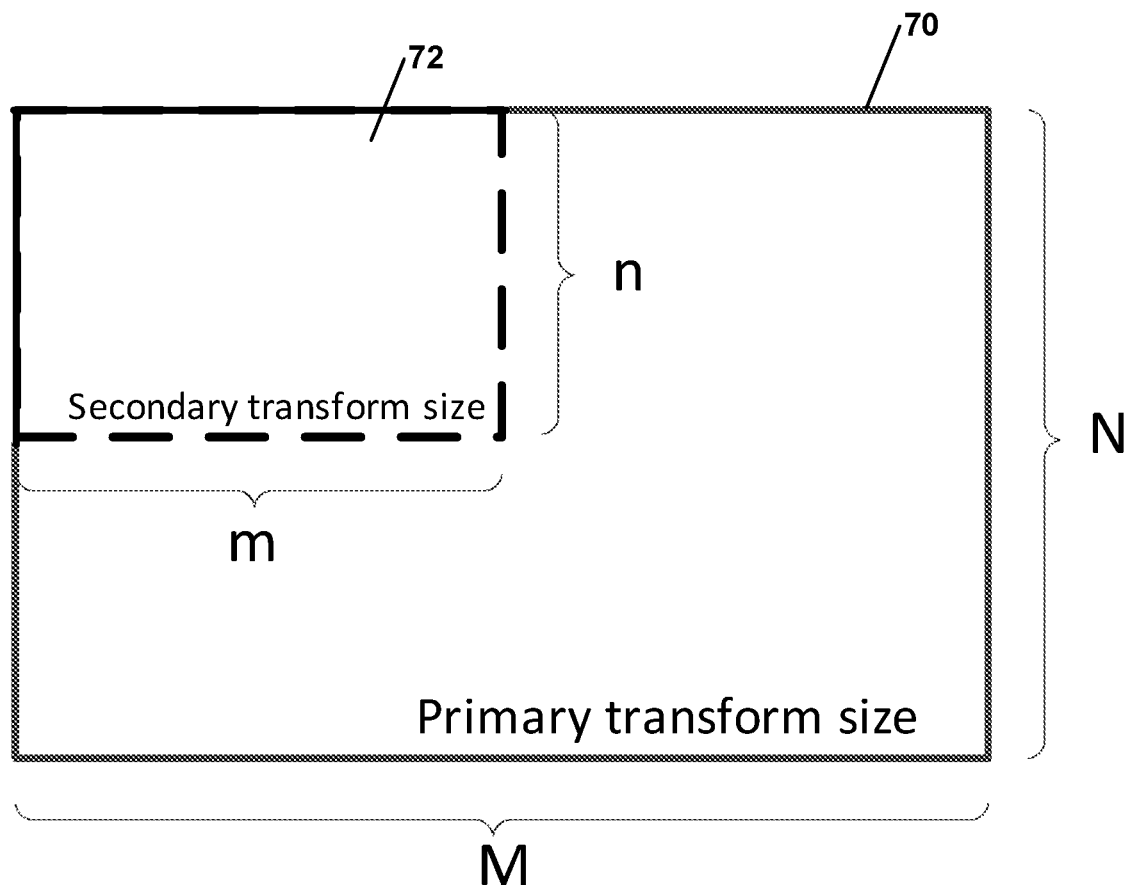
FIG. 7 is an illustration of a primary transform size for a block and a smaller secondary transform size for a sub-block of the block, in accordance with the techniques of this disclosure.

FIG. 7 is an illustration of a primary transform size for a block 70 and a smaller secondary transform size for a sub-block 72 of block 70, in accordance with the techniques of this disclosure. In general, the secondary transform may also be applied to other sub-blocks rather than the sub-block shown on in FIG. 7.

In FIG. 7, "M" is equal to the width of block 70, and "N" is equal to the height of block 70. Further, "m" is equal to the width of sub-block 72 within block 70, and "n" is equal to the height of sub-block 72. In this disclosure, the term "primary transform size" means the size of a block on which a video coding device applies a primary transform, such as block 70 in the example of FIG. 7. Similarly, the term "secondary transform size" means the size of a block on which a video coding device applies a secondary transform, such as sub-block 72 in the example of FIG. 7.

In accordance with some techniques of this disclosure, an alternate secondary transform can be applied when the primary transform size is equal to the secondary transform size. In other words, when the secondary transform size is equal to the primary transform size, the video coding device may select an alternate secondary transform to apply to the video data, the alternate secondary transform being more efficient than the original secondary transform. In one example, the alternate secondary transform may be a transform that requires different implementation style, for example with different latency or delay, such as matrix multiplication scheme and butterfly structure scheme. A butterfly structure scheme includes two processes: a simultaneous top-down traversal of the sub block with a bottom-up traversal of the sub-block to recursively compress all complementary sub-matrices, followed by a linear transformation of each value in the sub-block. The latency of a transform is defined as the total time or amount of clock cycles required to perform a transform process, i.e., from taking input and producing output coefficients.

In one example, the video coding device may automatically apply the alternate secondary transform to the sub-block if the primary transform size is equal to the smallest possible primary transform size (e.g., 4×4). If the primary transform size is the smallest possible size, the secondary transform size must be equal to the primary transform size. As such, in accordance with the techniques described herein, the video coding device would not apply the secondary transform as originally determined, and would instead apply the alternate secondary transform.

For example, a video coding device may apply a secondary transform implemented as a butterfly structure when the primary transform size is greater than the secondary transform size. However, in this example, the video coding device may apply an alternate secondary transform implemented as a matrix multiplication when the primary and the secondary transform sizes are equal, instead of applying the secondary transform implemented as the butterfly structure. An example of the matrix multiplication is the Hypercube-Givens Transform (HyGT), as described in U.S. patent application Ser. No. 15/432,500 by Said, et. al. For instance, in this example, the video coding device may apply the primary transform and secondary transform to a 4×4 block. In this case, the video coding device may implement the secondary transform, which is of 4×4 size, as a matrix multiplication, as the matrix multiplication may be more suitable for parallel implementation. In another example, whenever the 4×4 secondary transform size is applied to a sub-block of a block with a 4×4 primary transform size, the video coding device may use the lower-latency scheme, (e.g., matrix multiplication).

In one example, the video coding device may set a secondary transform size smaller than the primary transform size, and, if the residual block size is equal to the smallest secondary transform size, then the primary transform may be a non-separable transform. In other words, if the primary transform is not the smallest size (i.e., 4×4), the video coding device may select an initial secondary transform such that the secondary transform size is always smaller than the primary transform size. This may ensure that parallel processing, in accordance with the techniques described herein, is always possible. In addition, by making the primary transform a non-separable transform, the video coding device will always refrain from performing the secondary transform. For example, M=N=8, for 8×8 primary transform coefficient block, only 4×4 non-separable transform is applied on the top-left 4×4 low-frequency transform coefficient block.

In some examples, a secondary transform can be applied when the primary transform is partially finished. For example, when the primary transform goes from left to right, a video encoding device may apply a 2-dimensional primary transform by first applying a 1-dimensional horizontal transform to each row of a block, thereby generating an intermediate block. In this example, the video coding device may then apply a 1-dimensional vertical transform to each column of the intermediate block. Furthermore, in this example, if the secondary transform has 8×8 size, a video coding device may start applying the secondary transform after the video encoding device has finished applying the 1-dimensional vertical transform of the primary transform to the first 8 columns of the intermediate block. In this example, the 9th column and later columns of the primary transform and the video coding device may apply the secondary transform in parallel, reducing delay time. Secondary transforms having sizes other than 8×8 may be applicable as well.

In the decoding loop of this process, the video decoding device applies the secondary transform before the primary transform. As such, in the decoding loop, the video decoding device may apply the primary transform after the video decoding device finishes applying the secondary transform to the first 8 columns of the block.

In some examples, a transform block has a rectangular shape. For instance, a width of a transform block may be greater than a height of the transform block, or vice versa. If the height is greater than width, meaning the columns are longer than rows, waiting for the first N (e.g. 8) columns to finish may take longer, as compared to a rectangular-shaped block whose height is smaller than its width. In this case, before applying the primary and secondary transforms, video encoder 20 or video decoder 30 may transpose a rectangular-shaped block whose height is greater than its width. As a result of transposing the rectangular-shaped block, the width of the rectangular-shaped block is greater than the height of the rectangular-shaped block. The video coding device may transpose the block back to its original orientation after the video coding device applies the primary and secondary transforms. For the inverse transform, the transpose operation happens after applying inverse transform. The video coding device may attain similar results by applying vertical transform first followed by horizontal transform instead of transposing the block. However, in some examples, there may be some rounding process between the horizontal transform and the vertical transform. In this case, replacing the transposition of the block with switching the order of the horizontal transform and the vertical one-dimensional transform may not provide the same results. If the duality in the implementation is not possible, then the way the rectangular block is handled should be fixed at both encoder and decoder sides. Due to differences in rounding transforms, the video coding device may enforce this transposition on both software and hardware implementations.

In the above description, it is assumed that a horizontal transform is applied first, followed by a vertical transform in a 2-dimensional primary transform. If the vertical transform is applied first, then the video coding device may replace columns with rows, and height with width in the above description.

In another example, the video coding device may divide a block into two separate sub-blocks. In this example, a first sub-block may include every coefficient to which the video coding device will apply the secondary transform, and the second sub-block may include every coefficient to which the video coding device will only apply a primary transform (i.e., the video coding device will not apply a secondary transform to the second sub-block). The video coding device may optionally set each coefficient in the second sub-block to be equal to 0 (zero), or otherwise treat the value of each coefficient in the second sub-block as if it were equal to 0 (zero). The video coding device may process these two decoupled sub-blocks in parallel in the transform process by applying the secondary transform to the first sub-block while applying the primary transform to the second sub-block, thereby generating two residual blocks. The video coding device may derive the final residual block by summing of the two residual blocks generated from the parallel processing of the sub-blocks.

When the maximum size of a residual block is 8×8, two non-separable secondary transform (NSST) sizes that may be used are 4×4 and 8×8. Matrix multiplication-based schemes and HyGT-based schemes are available for both 4×4 and 8×8 NSST. In the encoding process, for a 4×4 residual block, a primary transform of size 4×4 is applied first, followed by a matrix multiplication-based 4×4 NSST scheme. For an 8×8 residual block, a primary transform of size 8×8 is applied first, followed by applying a 4×4 matrix multiplication-based NSST on the top-left 4×4 primary transform coefficient block. For a block larger than 8×8, the 8×8 HyGT-based NSST scheme is applied on the top-left 8×8 primary transform coefficient block.

In the decoding process, for a 4×4 residual block, a matrix multiplication-based 4×4 NSST scheme of size 4×4 is applied first, followed by a primary transform. For an 8×8 residual block, a 4×4 matrix multiplication-based NSST is applied first on the top-left 4×4 primary transform coefficient block, followed by applying a primary transform of size 8×8. For a block larger than 8×8, the 8×8 HyGT-based NSST scheme is applied on the top-left 8×8 primary transform coefficient block.

Figure 8:
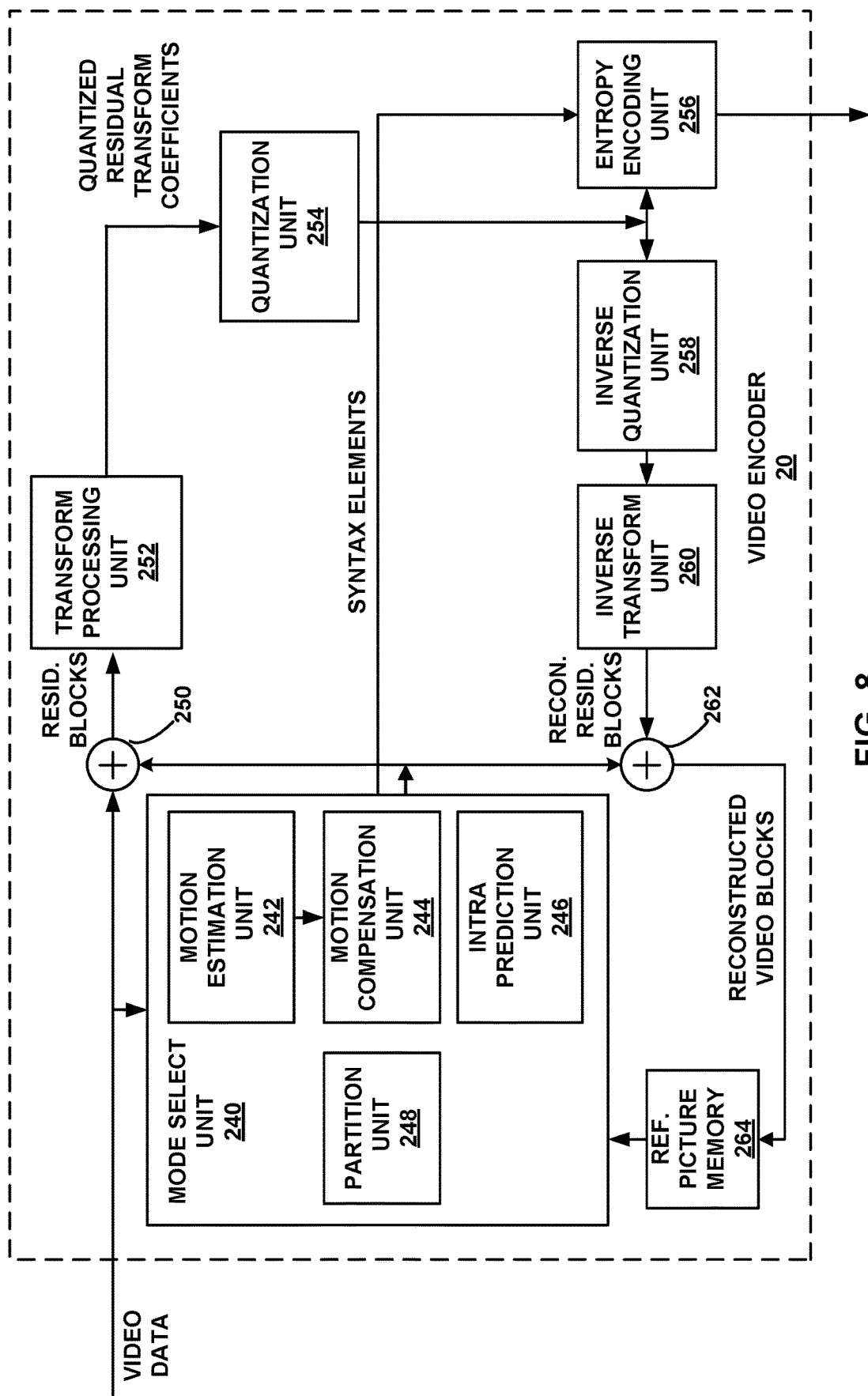
FIG. 8 is a block diagram illustrating an example of a video encoder that may implement techniques described in this disclosure.

FIG. 8 is a block diagram illustrating an example of video encoder 20 that may implement techniques described in this disclosure. In accordance with this disclosure, video encoder 20 may be configured to apply the techniques described in this disclosure, such as, for example, techniques relating to secondary transforms. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 8, video encoder 20 receives a current video block within a video frame to be encoded. In the example of FIG. 8, video encoder 20 includes mode select unit 240, reference picture memory 264 (which may also be referred to as a decoded picture buffer (DPB)), summer 250, transform processing unit 252, quantization unit 254, and entropy encoding unit 256. Mode select unit 240, in turn, includes motion compensation unit 244, motion estimation unit 242, intra-prediction unit 246, and partition unit 248. For video block reconstruction, video encoder 20 also includes inverse quantization unit 258, inverse transform unit 260, and summer 262. In some examples, a deblocking filter (not shown in FIG. 8) is also included to filter block boundaries to remove blockiness artifacts from reconstructed video. The deblocking filter filters the output of summer 262. Additional filters (in loop or post loop) may also be used in addition to the deblocking filter. Such filters are not shown for brevity, but if desired, may filter the output of summer 250 (as an in-loop filter).

During the encoding process, video encoder 20 receives a video frame or slice to be coded. The frame or slice may be divided into multiple video blocks. Motion estimation unit 242 and motion compensation unit 244 perform inter-predictive encoding of the received video block relative to one or more blocks in one or more reference frames to provide temporal prediction. Alternatively, intra-prediction unit 246 may perform intra-predictive encoding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 248 may partition blocks of video data into sub-blocks, based on evaluation of previous partitioning schemes in previous coding passes. For example, partition unit 248 may initially partition a frame or slice into LCUs, and partition each of the LCUs into CUs based on rate-distortion analysis (e.g., rate-distortion optimization). Mode select unit 240 may further produce a data structure indicative of partitioning of an LCU into CUs, such as, in some examples, a quadtree data structure. Leaf-node CUs of the quadtree may include one or more PUs and one or more TUs.

As part of encoding a CU, mode select unit 240 may select one of the prediction modes, intra or inter, e.g., based on error results, and may provide the resulting predicted block to summer 250 to generate residual data and to summer 262 to reconstruct the encoded CU for use in a reference frame. Mode select unit 240 also provides syntax elements, such as motion vectors, intra-mode indicators, partition information, and other such syntax information, to entropy encoding unit 256.

Motion estimation unit 242 and motion compensation unit 244 may be highly integrated, but are illustrated separately for conceptual purposes. Motion estimation, performed by motion estimation unit 242, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 264. For example, video encoder 20 may interpolate values of one-quarter pixel positions, one-eighth pixel positions, or other fractional pixel positions of the reference picture. Therefore, motion estimation unit 242 may perform a motion search relative to the full pixel positions and fractional pixel positions and output a motion vector with fractional pixel precision.

Motion estimation unit 242 calculates a motion vector for a PU of a video block in an inter-coded slice by comparing the position of the PU to the position of a predictive block of a reference picture. The reference picture may be selected from a first reference picture list (list 0) or a second reference picture list (list 1), each of which identify one or more reference pictures stored in reference picture memory 264. Motion estimation unit 242 sends the calculated motion vector to entropy encoding unit 256 and motion compensation unit 244.

Motion compensation, performed by motion compensation unit 244, may involve fetching or generating the predictive block based on the motion vector determined by motion estimation unit 242. Again, motion estimation unit 242 and motion compensation unit 244 may be functionally integrated, in some examples. Upon receiving the motion vector for the PU of the current video block, motion compensation unit 244 may locate the predictive block to which the motion vector points in one of the reference picture lists. Summer 250 forms a residual video block. As part of forming the residual video block, summer 250 may subtract pixel values of the predictive block from the pixel values of the current video block being coded, forming pixel difference values, as discussed below. In general, motion estimation unit 242 performs motion estimation relative to luma components, and motion compensation unit 244 uses motion vectors calculated based on the luma components for both chroma components and luma components. Mode select unit 240 may also generate syntax elements associated with the video blocks and the video slice for use by video decoder 30 in decoding the video blocks of the video slice.

Intra-prediction unit 246 may intra-predict a current block, as an alternative to the inter-prediction performed by motion estimation unit 242 and motion compensation unit 244, as described above. In particular, intra-prediction unit 246 may determine an intra-prediction mode to use to encode a current block. In some examples, intra-prediction unit 246 may encode a current block using various intra-prediction modes, e.g., during separate encoding passes, and intra-prediction unit 246 (or mode select unit 240, in some examples) may select an appropriate intra-prediction mode to use from the tested modes.

For example, intra-prediction unit 246 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 246 may calculate ratios from the distortions and rates for the various encoded blocks to determine which intra-prediction mode exhibits the best rate-distortion value for the block.

After selecting an intra-prediction mode for a block, intra-prediction unit 246 may provide information indicative of the selected intra-prediction mode for the block to entropy encoding unit 256. Entropy encoding unit 256 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block. As part of forming the residual video block, video encoder 20 may subtract the prediction data from mode select unit 240 from the original video block being coded. Summer 250 represents the component or components that perform this subtraction operation. Transform processing unit 252 applies a transform, such as a discrete cosine transform (DCT) or a conceptually similar transform, to the residual block, producing a video block comprising transform coefficient values. Wavelet transforms, integer transforms, sub-band transforms, DSTs, or other types of transforms could be used instead of a DCT. In any case, transform processing unit 252 applies the transform to the residual block, producing a block of transform coefficients. The transform may convert the residual information from a pixel domain to a transform domain, such as a frequency domain.

Inverse transform unit 260 may perform the techniques of this disclosure with regards to applying primary and secondary transforms. For instance, inverse transform unit 260 may apply a primary transform to a block (e.g., a current TU or some other type of block) of the video data. The primary transform may have a first size. Inverse transform unit 260 may determine whether application of a secondary transform to a sub-block of the block is allowed, the secondary transform having a second size. Application of the secondary transform to the sub-block is disallowed when the first size is equal to the second size. Based on the application of the secondary transform to the sub-block being allowed, inverse transform unit 260 may apply the secondary transform to the sub-block. Application of the primary transform to the block and the secondary transform to the sub-block constructs a residual block. Summer 262 may reconstruct the block based on the residual block and one or more corresponding predictive blocks.

Quantization unit 254 quantizes the transform coefficients to further reduce bit rate. The quantization process may reduce the bit depth associated with some or all of the coefficients. The degree of quantization may be modified by adjusting a quantization parameter.

Following quantization, entropy encoding unit 256 scans and entropy encodes syntax elements indicating the quantized transform coefficients. For example, entropy encoding unit 256 may perform CAVLC, CABAC, SBAC, PIPE coding or another entropy coding technique. In the case of context-based entropy coding, context may be based on neighboring blocks. Following the entropy coding by entropy encoding unit 256, the encoded bitstream may be transmitted to another device (e.g., video decoder 30) or archived for later transmission or retrieval.

Inverse quantization unit 258 and inverse transform unit 260 apply inverse quantization and inverse transformation, respectively, to reconstruct the residual block in the pixel domain. In particular, summer 262 adds the reconstructed residual block to the motion compensated prediction block earlier produced by motion compensation unit 244 or intra-prediction unit 246 to produce a reconstructed video block for storage in reference picture memory 264. The reconstructed video block may be used by motion estimation unit 242 and motion compensation unit 244 as a reference block to inter-code a block in a subsequent video frame.

Video encoder 20 generally uses the process discussed above to encode each block of each picture in a coded video sequence. In addition, in some examples, video encoder 20 may determine temporal layers to which to assign each of the pictures. Furthermore, video encoder 20 may be configured to encode pictures of other layers, e.g., other views, scalable video coding layers, or the like. In any case, video encoder 20 may further encode data indicating a layer to which each picture belongs, for one or more layers (e.g., of various video dimensions).

Figure 9:
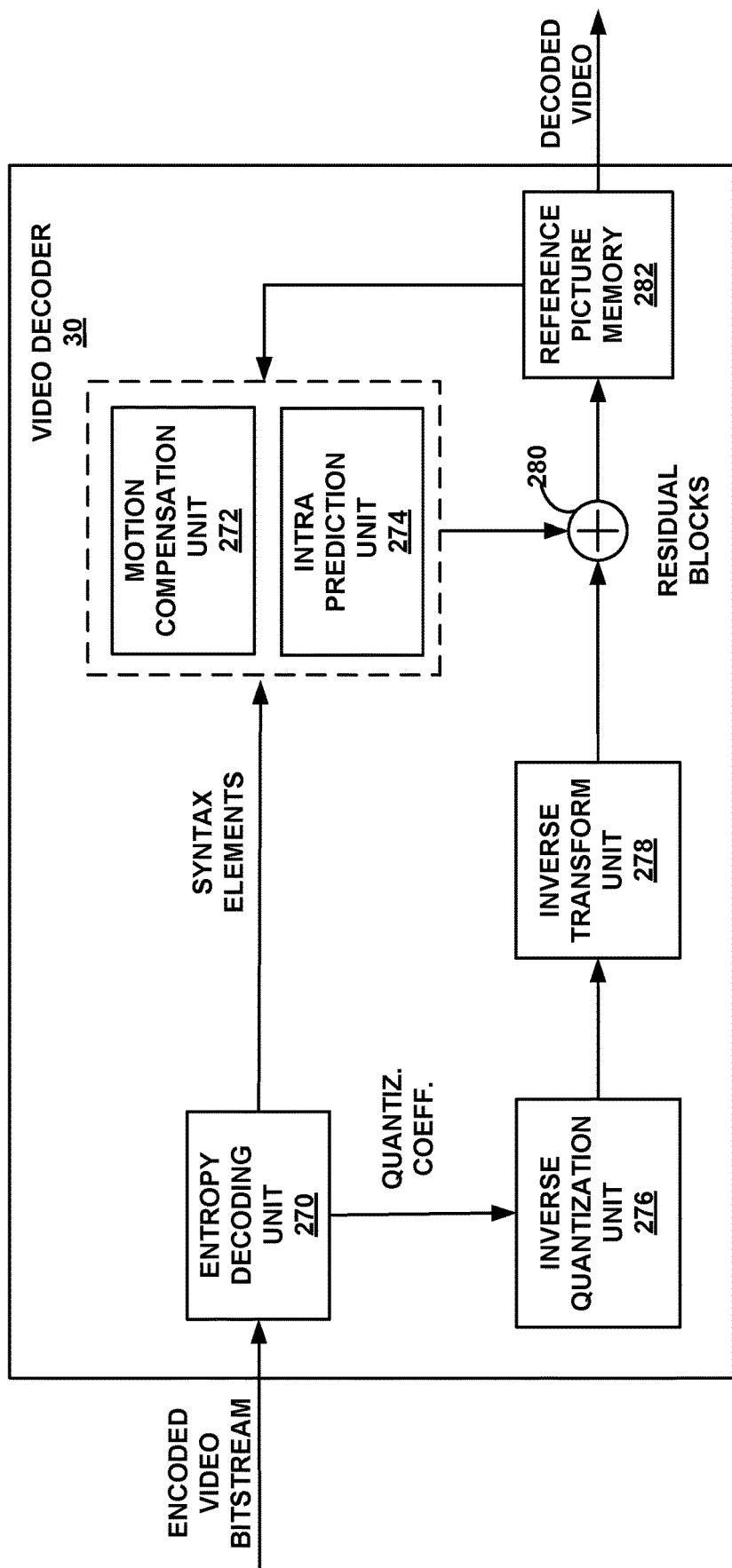
FIG. 9 is a block diagram illustrating an example of a video decoder that may implement techniques described in this disclosure.

FIG. 9 is a block diagram illustrating an example of video decoder 30 that may implement techniques described in this disclosure. In accordance with this disclosure, video decoder 30 may be configured to apply the techniques described in this disclosure, such as, for example, techniques relating to secondary transforms. In the example of FIG. 9, video decoder 30 includes an entropy decoding unit 270, motion compensation unit 272, intra prediction unit 274, inverse quantization unit 276, inverse transformation unit 278, reference picture memory 282, and summer 280. Video decoder 30 may, in some examples, perform a decoding pass generally reciprocal to the encoding pass described with respect to video encoder 20 (FIG. 8). Motion compensation unit 272 may generate prediction data based on motion vectors received from entropy decoding unit 270, while intra prediction unit 274 may generate prediction data based on intra-prediction mode indicators received from entropy decoding unit 270.

During the decoding process, video decoder 30 receives an encoded video bitstream that represents video blocks of an encoded video slice and associated syntax elements from video encoder 20. Entropy decoding unit 270 of video decoder 30 entropy decodes syntax elements in the bitstream to generate quantized coefficients, or intra-prediction mode indicators, and other syntax elements. Entropy decoding unit 270 forwards the syntax elements to motion compensation unit 272. Video decoder 30 may receive the syntax elements at the video slice level and/or the video block level.

When the video slice is coded as an intra-coded (I) slice, intra prediction unit 274 may generate prediction data for a video block of the current video slice based on a signaled intra prediction mode and data from previously decoded blocks of the current frame or picture. When the video frame is coded as an inter-coded (i.e., B, P or a generalized P and B-picture (GPB)) slice, motion compensation unit 272 produces predictive blocks for a video block of the current video slice based on the motion vectors and other syntax elements received from entropy decoding unit 270. The predictive blocks may be produced from one of the reference pictures within one of the reference picture lists. Video decoder 30 may construct the reference frame lists, list 0 and list 1, using default construction techniques based on reference pictures stored in reference picture memory 282. Motion compensation unit 272 determines prediction information for a video block of the current video slice by parsing the motion vectors and other syntax elements, and uses the prediction information to produce the predictive blocks for the current video block being decoded. For example, motion compensation unit 272 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 272 may also perform interpolation based on interpolation filters. Motion compensation unit 272 may use interpolation filters as used by video encoder 20 during encoding of the video blocks to calculate interpolated values for sub-integer pixels of reference blocks. In this case, motion compensation unit 272 may determine the interpolation filters used by video encoder 20 from the received syntax elements and use the interpolation filters to produce predictive blocks.

Inverse quantization unit 276 inverse quantizes, i.e., de-quantizes, the quantized transform coefficients provided in the bitstream and decoded by entropy decoding unit 270. The inverse quantization process may include use of a quantization parameter $QP_y$ calculated by video decoder 30 for each video block in the video slice to determine a degree of quantization and, likewise, a degree of inverse quantization that should be applied.

Inverse transform unit 278 applies an inverse transform, e.g., an inverse DCT, an inverse integer transform, or a conceptually similar inverse transform process, to the transform coefficients in order to produce residual blocks in the pixel domain. Additionally, inverse transform unit 278 may perform the techniques of this disclosure for performing primary and secondary transforms. For instance, inverse transform unit 278 may apply a primary transform to a block of the video data. The primary transform may have a first size. Inverse transform unit 278 may determine whether application of a secondary transform to a sub-block of the block is allowed, the secondary transform having a second size. Application of the secondary transform to the sub-block is disallowed when the first size is equal to the second size. Based on the application of the secondary transform to the sub-block being allowed, inverse transform unit 278 may apply the secondary transform to the sub-block. Application of the primary transform to the block and the secondary transform to the sub-block constructs a residual block in a pixel domain. Summer 280 may reconstruct the block based on the residual block and one or more corresponding predictive blocks, such as by adding samples of the residual block to corresponding samples of the one or more corresponding predictive blocks.

After motion compensation unit 272 generates the predictive block for the current video block based on the motion vectors and other syntax elements, video decoder 30 forms a decoded video block. As part of forming the decoded video block, video decoder 30 may sum the residual blocks from inverse transform unit 278 with the corresponding predictive blocks generated by motion compensation unit 272. Summer 280 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 282, which stores reference pictures used for subsequent motion compensation. Reference picture memory 282 also stores decoded video for later presentation on a display device, such as display device 32 of FIG. 1.

Video decoder 30 generally uses the process discussed above to decode each block of each picture in a coded video sequence. In addition, in some examples, video decoder 30 may decode data indicating temporal layers to which pictures are assigned. Furthermore, video decoder 30 may be configured to decode pictures of other layers, e.g., other views, scalable video coding layers, or the like. In any case, video decoder 30 may further decode data indicating a layer to which each picture belongs, for one or more layers (e.g., of various video dimensions).

Figure 10:
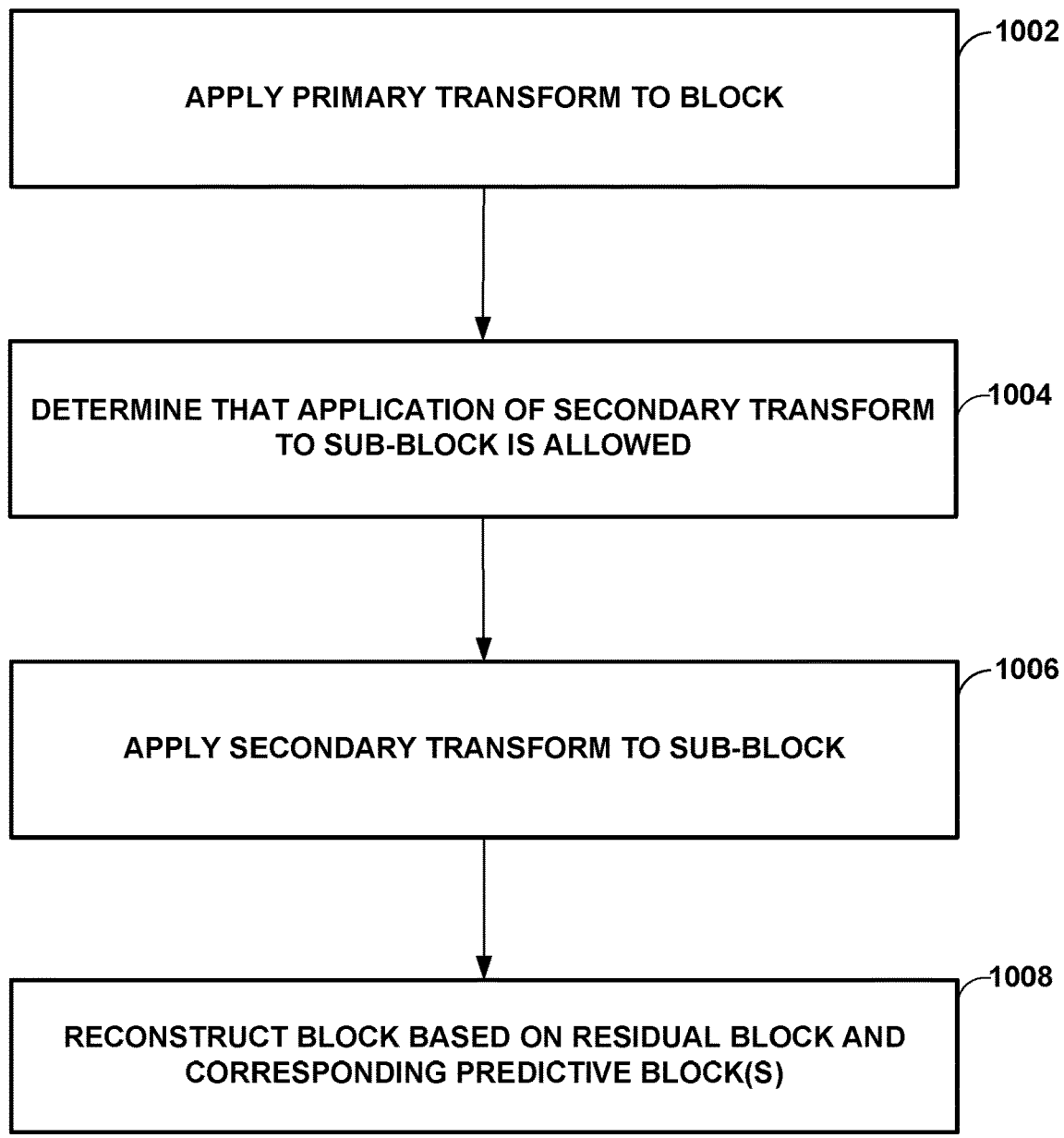
FIG. 10 is a flow diagram illustrating an example technique for coding video data in accordance with the techniques described in this disclosure.

FIG. 10 is a flow diagram illustrating a first example decoding of video data that may implement techniques described in this disclosure. The method of FIG. 10 may be performed by a video coding device, such as video encoder 20 or video decoder 30.

In the example of FIG. 10, in accordance with the techniques of this disclosure, the video coding device may apply a primary transform to a block (e.g., a current TU of a CU, or some other type of block) of the video data (1002). The primary transform may have a first size. The video coding device may determine whether application of a secondary transform to a sub-block of the block is allowed (1004), the secondary transform having a second size. Application of the secondary transform to the sub-block is disallowed when the first size is equal to the second size. Based on the application of the secondary transform to the sub-block being allowed, the video coding device may apply the secondary transform to the sub-block (1006). Application of the primary transform to the current TU and the secondary transform to the sub-block constructs a residual block in a pixel domain.

The video coding device may reconstruct the block based on the residual block and one or more corresponding predictive blocks (1008). In some examples, reconstructing the block may include decoding. In such instances, the video coding device may form a decoded video block by summing the residual block with the one or more predictive blocks. In some examples, reconstructing the block may include encoding. In such instances, the video coding device may encode the block and the residual block in a bitstream.

In some examples, the sub-block may be a top-left portion of the block. In some instances, the primary transform size is 4×4.

In some examples, the video coding device may further apply a second primary transform to a second block of the video data, the second primary transform having a third size. The video coding device may determine whether application of a second secondary transform to a sub-block of the second block is allowed. The second secondary transform may have a fourth size. Application of the second secondary transform to the sub-block of the second block is disallowed when the third size is equal to the fourth size. Based on the application of the second secondary transform to the sub-block of the second block being disallowed, the video coding device may determine an alternate secondary transform to perform on the sub-block of the second block and perform the alternate secondary transform on the sub-block of the second block after the completion of the second primary transform. In some instances, the secondary transform may have a first latency, and the alternate secondary transform may have a second latency. In such instances, the first latency may be different than the second latency. In some examples, the alternate secondary transform may be one of a matrix multiplication scheme or a butterfly structure scheme.

In some examples, the primary transform may be a non-separable transform when the first size is greater than the second size and when the first size is equal to a minimum secondary transform size. In such instances, responsive to determining that the primary transform comprises the non-separable transform, the video coding device may further refrain from performing the secondary transform on the sub-block.

In some examples, in applying the secondary transform, the video coding device may determine whether the primary transform is complete for the sub-block. In such instances, the video coding device may, responsive to determining the primary transform is complete for the sub-block, begin application of the secondary transform to the sub-block in parallel with the completing application of the primary transform to the block.

In some instances, the residual block may be a final residual block, and the block may be a transform coefficient block. In such instances, the sub-block may be a first sub-block, and the transform coefficient block includes the first sub-block and a second sub-block. The video coding device may, while performing the secondary transform on the first sub-block, set each coefficient in the second sub-block to equal zero. The video coding device may further process the first sub-block and the second sub-block in parallel, wherein processing the first sub-block comprises generating a first residual block by applying the secondary transform and the primary transform to the first sub-block, and processing the second sub-block comprises generating a second residual block by applying the primary transform to the second sub-block. The video coding device may then determine the final residual block for the block as a sum of the first residual block and the second residual block.

In some examples, the block may be rectangular with a width of the block being greater than a height of the block. In such examples, in applying the primary transform in the encoding process, the video coding device may perform a vertical transform on the block and perform a horizontal transform on the block (or some other transposition or rotation). In the decoding process, the video coding device may apply the inverse primary transform and the inverse secondary transform prior to performing one of a transposition or a rotation on the residual block.

Further, in applying the secondary transform, the video coding device may determine whether the primary transform is complete for a first row of the block and, responsive to determining the primary transform is complete for the first row of the block, begin application of the secondary transform to a first row of the sub-block in parallel with the completing application of the primary transform to the block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method for coding video data, the method comprising:
  applying a first primary transform to a first block of the video data, the first primary transform having a first size;
  determining whether a second size of a first secondary transform is equal to the first size based on the second size not being equal to the first size,
  applying the first secondary transform to a first sub-block, wherein the first sub-block comprises at least a portion of the first block, and wherein application of the first primary transform to the first block and application of the first secondary transform to the first sub-block construct a residual block in a pixel domain;
  reconstructing the block based on the residual block and one or more corresponding predictive blocks;
  applying a second primary transform to a second block of the video data, the second primary transform having a third size;
  determining whether a fourth size of a second secondary transform is equal to the third size;
  based on the fourth size being equal to the third size determining an alternate secondary transform to perform on a sub-block of the second block, wherein the alternate secondary transform is smaller than the second primary transform; and performing the alternate secondary transform on the sub-block of the second block after the completion of the second primary transform.

2. The method of claim 1, wherein the first sub-block comprises a top-left portion of the block.

3. The method of claim 1, wherein the second secondary transform has a first latency, and wherein the alternate secondary transform has a second latency, and
wherein the first latency is different than the second latency.

4. The method of claim 1, wherein the alternate secondary transform comprises one of a matrix multiplication scheme or a butterfly structure scheme.

5. The method of claim 1, wherein the first size is 8×8, and wherein the method further comprises:
selecting the first secondary transform such that the second size is 4×4.

6. The method of claim 1, wherein the first primary transform is a non-separable transform when the first size is equal to a minimum secondary transform size.

7. The method of claim 6, further comprising:
based on determining that the first primary transform comprises the non-separable transform, refraining from performing the first secondary transform on the first sub-block.

8. The method of claim 1, wherein applying the first secondary transform comprises:
determining whether the first primary transform is complete for the first sub-block; and
based on determining the first primary transform is complete for the first sub-block, beginning application of the first secondary transform to the first sub-block in parallel with the completing application of the first primary transform to the first block.

9. The method of claim 1, wherein the residual block is a final residual block, the first block is a transform coefficient block, the transform coefficient block comprises the first sub-block and a second sub-block, and the method further comprises:
while performing the first secondary transform on the first sub-block, setting each coefficient in the second sub-block to equal zero;
processing the first sub-block and the second sub-block in parallel, wherein processing the first sub-block comprises generating a first residual block by applying the first secondary transform and the first primary transform to the first sub-block, and processing the second sub-block
comprises generating a second residual block by applying the first primary transform to the second sub-block; and
determining the final residual block as a sum of the first residual block and the second residual block.

10. The method of claim 1, wherein a height of the first block is greater than a width of the block, wherein applying the first primary transform comprises:
performing a vertical transform on the first block; and
performing a horizontal transform on the first block, such that the width of the first block is greater than the height of the first block after the vertical transform and the horizontal transform.

11. The method of claim 1, wherein the first primary transform comprises an inverse primary transform, wherein the first secondary transform comprises an inverse secondary transform, and wherein the method further comprises:
after applying the first secondary transform, based on a height of the residual block being greater than a width of the residual block:
performing one of a transposition or a rotation on the residual block such that the width of the first block is greater than the height of the first block after the transposition or the rotation.

12. The method of claim 1, wherein applying the first secondary transform comprises:
determining whether the first primary transform is complete for a first row of the block; and
based on determining the first primary transform is complete for the first row of the first block, beginning application of the first secondary transform to a first row of the first sub-block in parallel with the completing application of the first primary transform to the first block.

13. The method of claim 1, wherein coding the video data comprises encoding the video data, and wherein the method further comprises:
applying a third transform and a fourth transform to the first block to generate a block of transform coefficients, the first primary transform being an inverse transform of the third transform, the first secondary transform being an inverse transform of the fourth transform; and
encoding the first block and the residual block in a bitstream.

14. The method of claim 1, wherein coding the video data comprises decoding the video data, and wherein reconstructing the first block comprises:
reconstructing the first block by summing the residual block with the one or more predictive blocks to form a reconstructed block; and
decoding the reconstructed block.

15. A device for processing video data, the device comprising:
a memory for storing video data; and
one or more processors configured to:
apply a first primary transform to a first block of the video data, the first primary transform having a first size;
determine whether a second size of a first secondary transform is equal to the first size;
based on the second size not being equal to the first size application of the first secondary transform to the first sub block being allowed, apply the first secondary transform to the first sub-block, wherein the first sub-block comprises at least a portion of the first block, and wherein application of the first primary transform to the first block and the first secondary transform to the first sub-block construct a residual block;
reconstruct the block based on the residual block and one or more corresponding predictive blocks;
apply a second primary transform to a second block of the video data, the second primary transform having a third size;
determine whether a fourth size of a second secondary transform is equal to the third size
based on the fourth size being equal to the third size
determine an alternate secondary transform to perform on the sub-block of the second block, wherein the alternate secondary transform is smaller than the second primary transform; and
perform the alternate secondary transform on the sub-block of the second block after the completion of the second primary transform.

16. The device of claim 15, wherein the one or more processors being configured to perform the first secondary transform comprise the one or more processors being configured to:

determine whether the first primary transform is complete for the first sub-block; and based on determining the first primary transform is complete for the first sub-block, begin application of the first secondary transform to the first sub-block in parallel with the completing application of the first primary transform to the first block.

17. The device of claim 15, wherein the residual block is a final residual block, the first block is a transform coefficient block, the transform coefficient block comprises the first sub-block and a second sub-block, and the one or more processors are further configured to:

while performing the first secondary transform on the first sub-block, set each coefficient in the second sub-block to equal zero;

process the first sub-block and the second sub-block in parallel, wherein processing the first sub-block comprises generating a first residual block by applying the first secondary transform and the first primary transform to the first sub-block, and processing the second sub-block comprises generating a second residual block by applying the first primary transform to the second sub-block; and determine the final residual block as a sum of the first residual block and the second residual block.

18. The device of claim 15, wherein the device further comprises at least one of a camera configured to capture a picture including the first block or a display configured to display the reconstructed block.

* * * * *